United States Patent
Kanno

(10) Patent No.: US 12,073,122 B2
(45) Date of Patent: *Aug. 27, 2024

(54) MEMORY SYSTEM WITH CONTROLLER TO WRITE DATA TO MEMORY BASED ON LIFETIME INFORMATION IN WRITE COMMAND

(71) Applicant: KIOXIA CORPORATION, Tokyo (JP)

(72) Inventor: Shinichi Kanno, Ota (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,315

(22) Filed: Jun. 19, 2023

(65) Prior Publication Data

US 2023/0333779 A1    Oct. 19, 2023

Related U.S. Application Data

(63) Continuation of application No. 17/684,647, filed on Mar. 2, 2022, now Pat. No. 11,720,288, which is a continuation of application No. 16/815,547, filed on Mar. 11, 2020, now Pat. No. 11,301,171.

(30) Foreign Application Priority Data

Aug. 29, 2019   (JP) .................................. 2019-157078

(51) Int. Cl.
G06F 3/06    (2006.01)

(52) U.S. Cl.
CPC .......... *G06F 3/0659* (2013.01); *G06F 3/0616* (2013.01); *G06F 3/064* (2013.01); *G06F 3/0679* (2013.01)

(58) Field of Classification Search
CPC ...... G06F 3/0616; G06F 3/064; G06F 3/0647; G06F 3/0659; G06F 3/0679; G06F 12/0246; G06F 2212/7201; G06F 2212/7209

See application file for complete search history.

(56) References Cited

U.S. PATENT DOCUMENTS

| | | | |
|---|---|---|---|
| 9,229,854 | B1 | 1/2016 | Kuzmin |
| 9,846,542 | B2 | 12/2017 | Seo et al. |
| 10,191,688 | B2 | 1/2019 | Amaki et al. |
| 10,296,455 | B2 | 5/2019 | Yanagida |
| 2016/0313943 | A1 | 10/2016 | Hashimoto |
| 2017/0242625 | A1* | 8/2017 | Pandurangan ........ G06F 3/0659 |

(Continued)

*Primary Examiner* — Larry T Mackall
(74) *Attorney, Agent, or Firm* — Oblon, McClelland, Maier & Neustadt, L.L.P.

(57) ABSTRACT

According to one embodiment, a memory system detects a first block in which an elapsed time from a time point at which the block has been filled with write data exceeds a first period. The memory system notifies a host of a list of identifiers capable of identifying valid data portions stored in the first block or a list of identifiers capable of identifying all data portions stored in the first block. When receiving, from the host, a first copy request specifying one or more valid data portions stored in the first block as copy target data and specifying the second block group as a copy destination block group, the memory system copies the one or more valid data portions specified as the copy target data from the first block to the second block group.

10 Claims, 17 Drawing Sheets

Write command

| | Explanation |
|---|---|
| Command ID | Command ID of write command |
| Lifetime information | Period corresponding to lifetime of data to be written (or identifier associated with this period) |
| Tag | Identifier of data to be written (e.g. LBA, key of key value store or hash value of key) |
| Length | Length of data to be written |
| Write buffer address | Location in host memory in which data to be written is stored |

(56) References Cited

U.S. PATENT DOCUMENTS

| | | |
|---|---|---|
| 2018/0307598 A1 | 10/2018 | Fischer |
| 2019/0155521 A1 | 5/2019 | Bahirat et al. |
| 2019/0205249 A1 | 7/2019 | Byun |
| 2021/0026558 A1 | 1/2021 | Zhang |

* cited by examiner

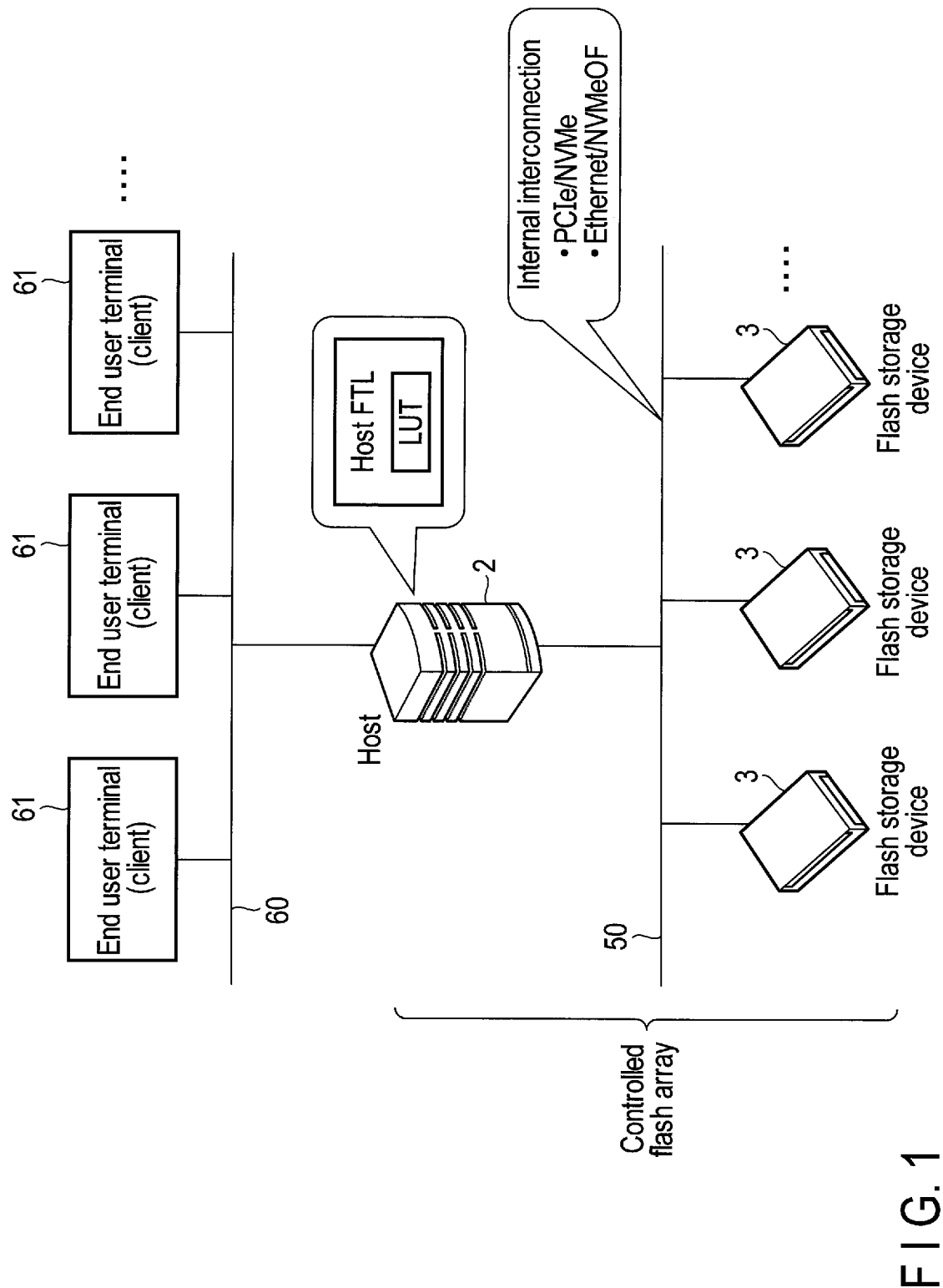
F I G. 1

FIG. 5

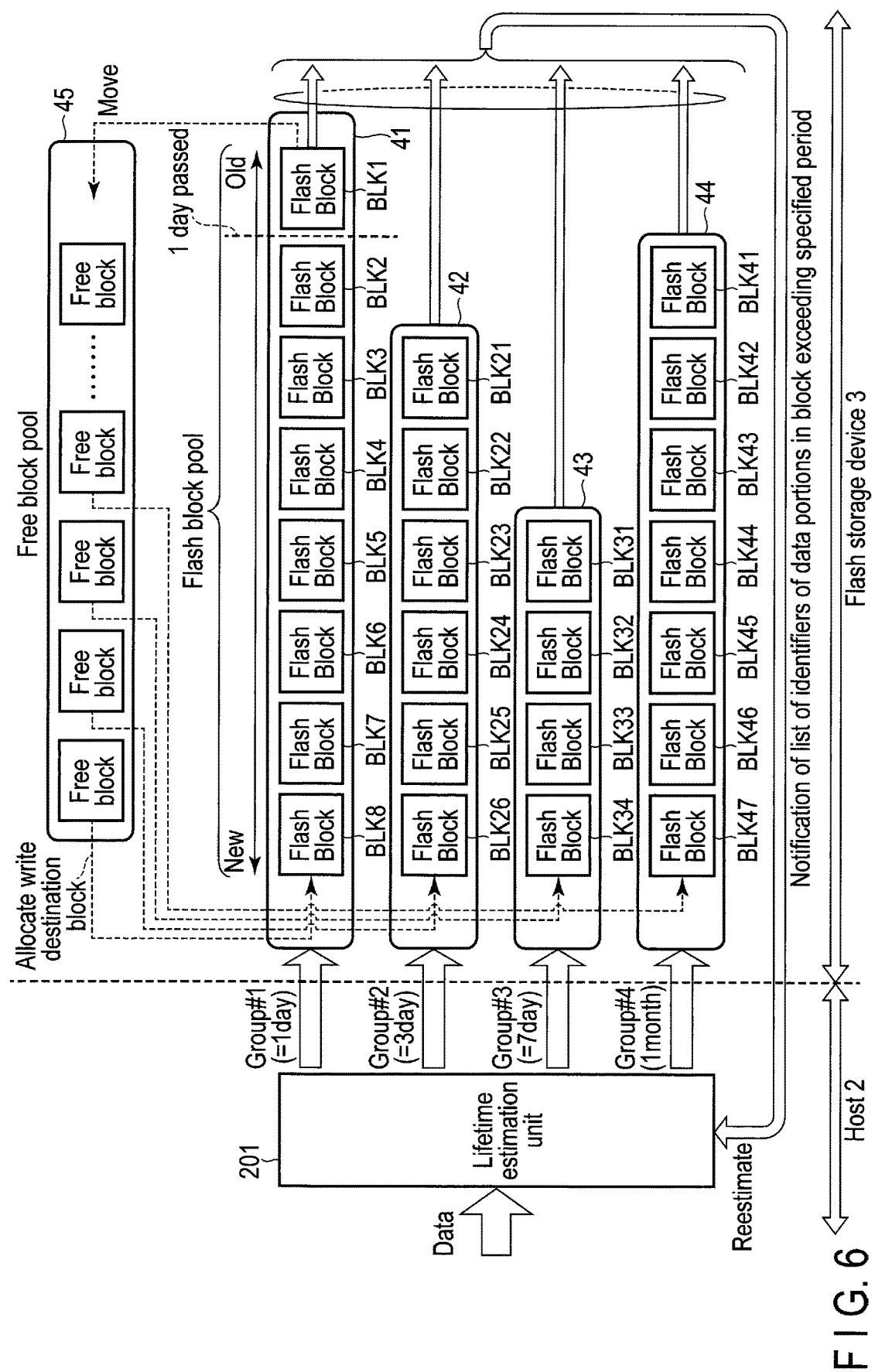
F I G. 6

BLK1

|  | offset0 | offset1 | offset2 | offset3 |
|---|---|---|---|---|
| Page0 | D1 (LBA11) | D2 (LBA12) | D3 (LBA21) | D4 (LBA25) |
| Page1 | D5 (LBA31) | D6 (LBA32) | D7 (LBA33) | D8 (LBA40) |
| Page2 | D9 (LBA51) | D10 (LBA52) | D11 (LBA61) | D12 (LBA62) |
| Page3 | D13 (LBA71) | D14 (LBA72) | D15 (LBA73) | D16 (LBA74) |

Valid bit map of BLK1

|  | offset0 | offset1 | offset2 | offset3 |
|---|---|---|---|---|
| Page0 | 1 | 1 | 1 | 0 |
| Page1 | 1 | 0 | 0 | 0 |
| Page2 | 0 | 1 | 0 | 0 |
| Page3 | 1 | 0 | 0 | 0 |

Notification of LBA list

LBA11, LBA12, LBA21, LBA31, LBA52, LBA71
(or LBA11, LBA12, LBA21, LBA25, LBA31, LBA32, LBA33
LBA40, LBA51, LBA52, LBA61, LBA62, LBA71, LBA72,
LBA73, LBA74)

F I G. 7

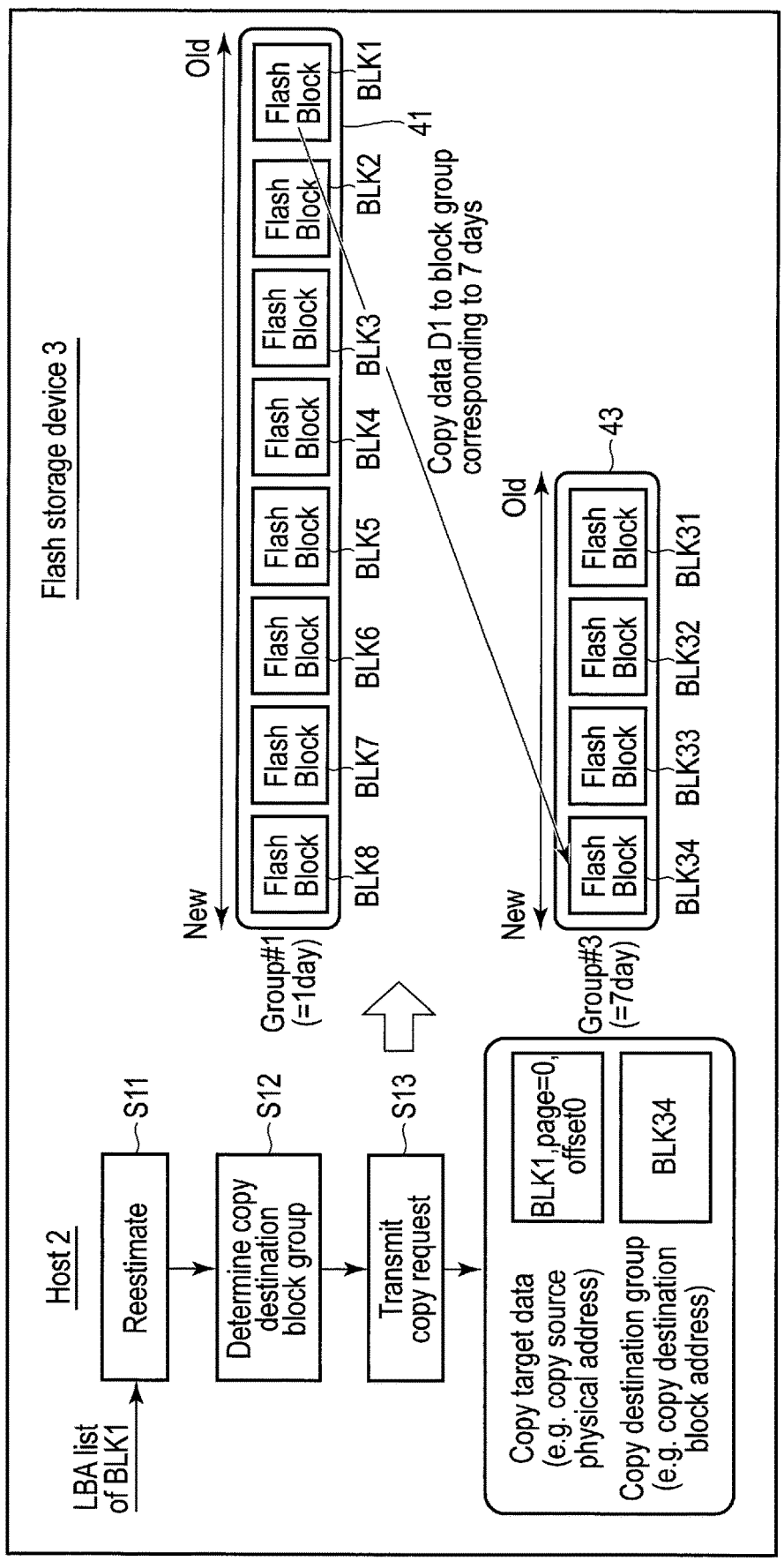
F I G. 8

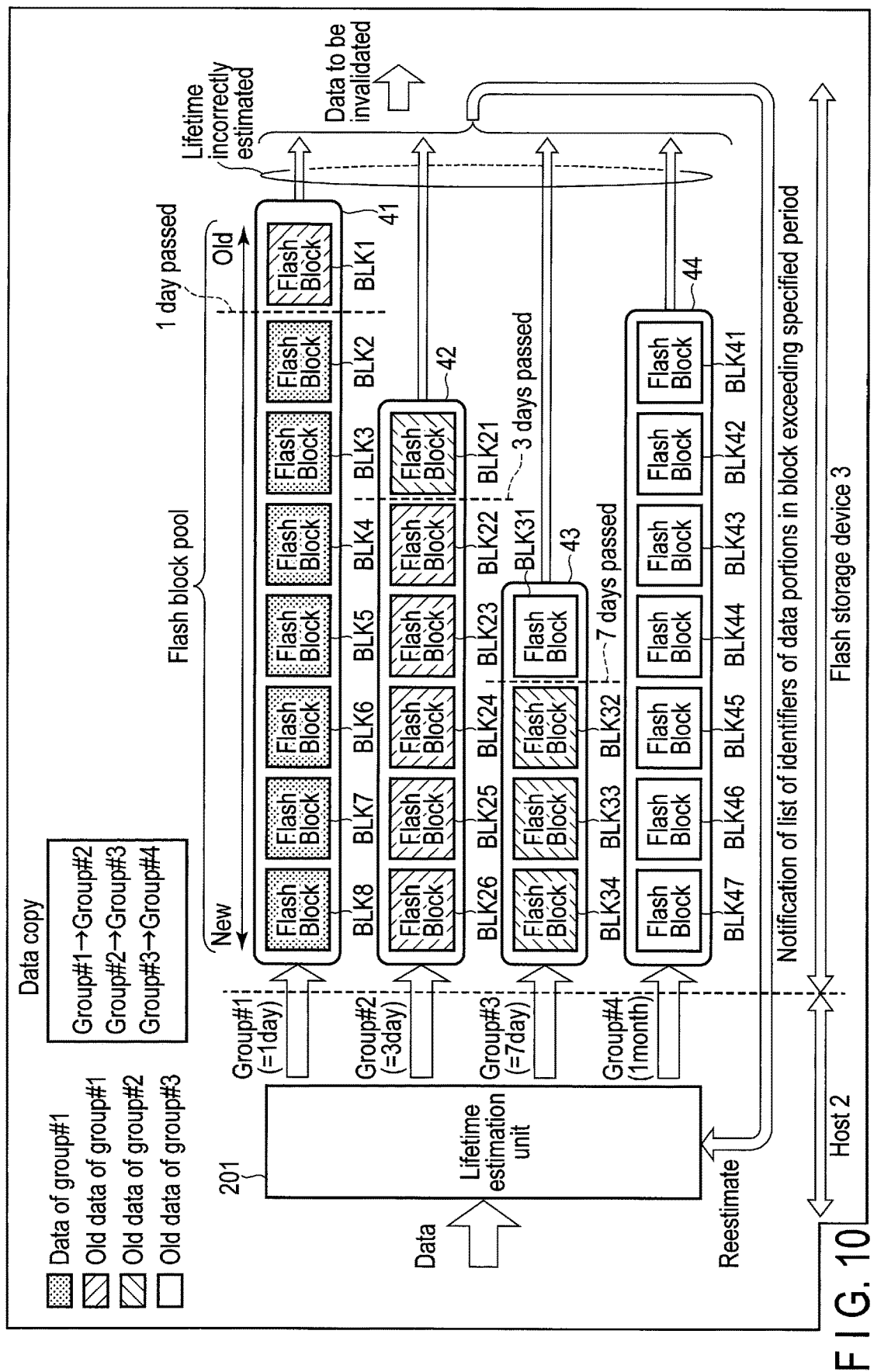
F I G. 10

Write command

|  | Explanation |
|---|---|
| Command ID | Command ID of write command |
| Lifetime information | Period corresponding to lifetime of data to be written (or identifier associated with this period) |
| Tag | Identifier of data to be written (e.g. LBA, key of key value store or hash value of key) |
| Length | Length of data to be written |
| Write buffer address | Location in host memory in which data to be written is stored |

F I G. 12

Address recording request

|  | Explanation |
|---|---|
| Tag | Identifier of written data |
| Physical address | Physical address indicative of physical storage location in which data is written |
| Length | Length of written data |

F I G. 13

Read command

| | Explanation |
|---|---|
| Command ID | Command ID of read command |
| Physical address | Physical address indicative of physical storage location in which data to be read is stored |
| Length | Length of data to be read |
| Read buffer address | Location in read buffer of host to which data should be transferred |

F I G. 14

Copy command

| | Explanation |
|---|---|
| Command ID | Command ID of copy command |
| Source physical address | Block address of copy source block |
| Destination physical address (or identifier of destination block group) | Block address of copy destination block |
| Bit map | Bit map specifying each copy target data portion |

F I G. 15

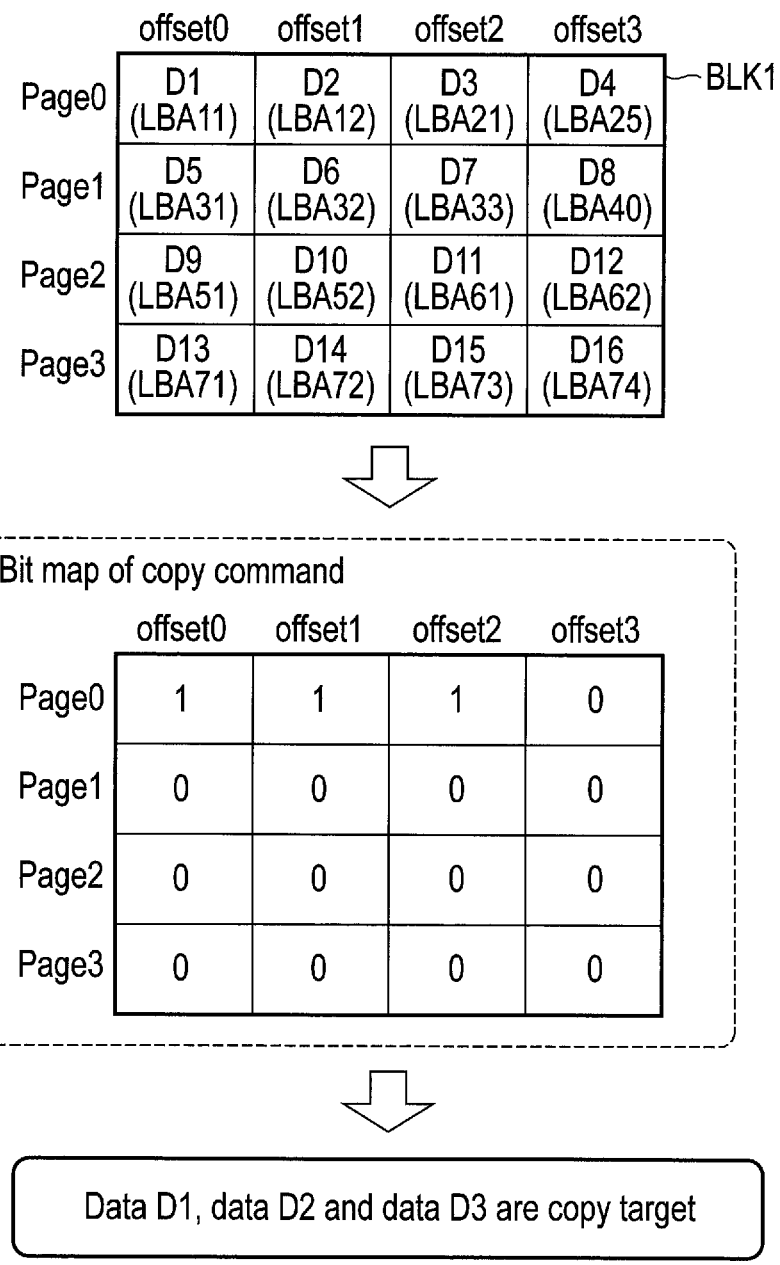
F I G. 16

Erase command

| | Explanation |
|---|---|
| Command ID | Command ID of erase command |
| Block address | Block address of erase target block |

F I G. 17

Trim command

| | Explanation |
|---|---|
| Command ID | Command ID of trim command |
| Physical address | Physical address indicative of first physical address in which data to be invalidated is stored |
| Length | Length of data to be invalidated |

F I G. 18

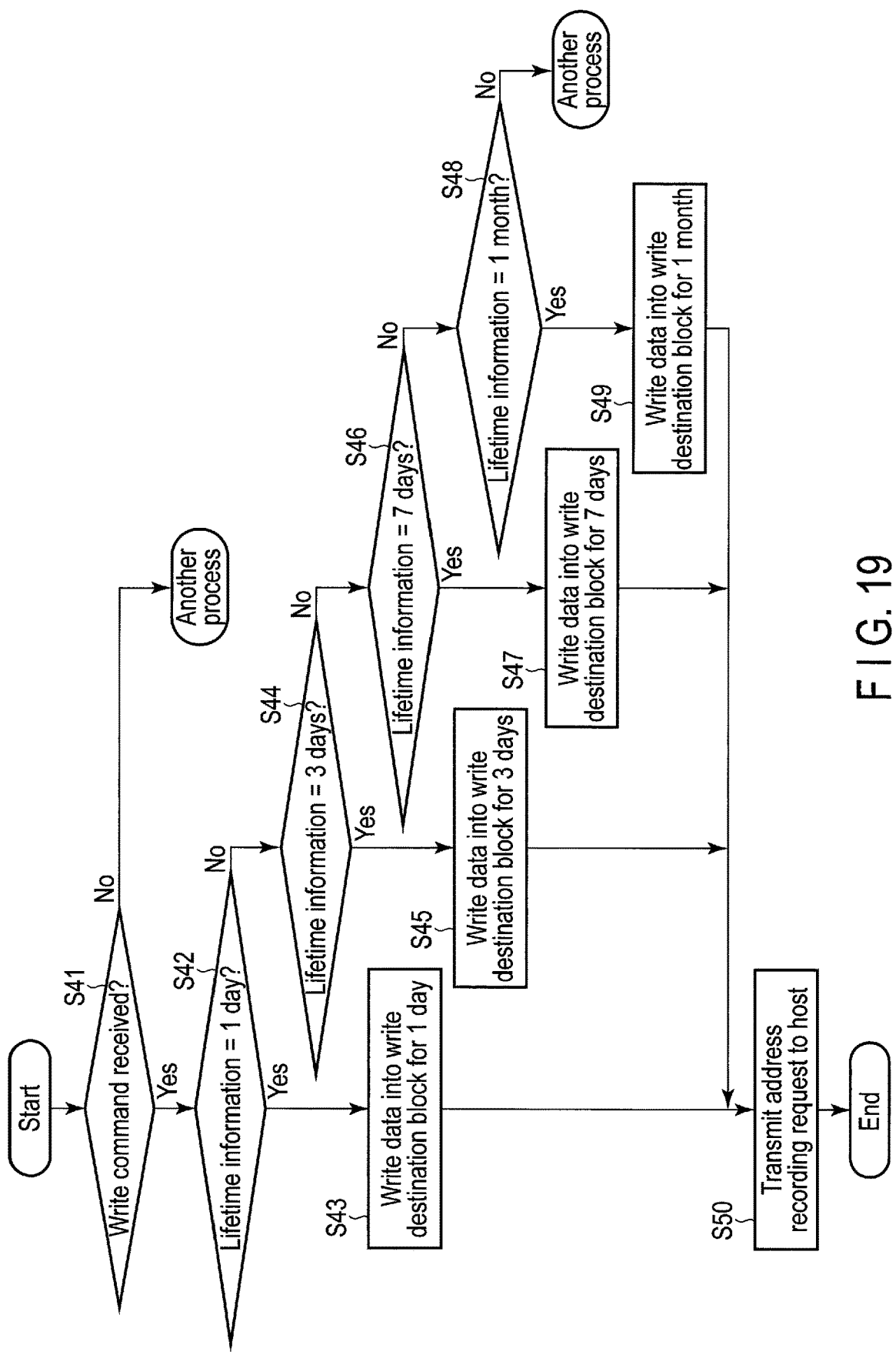
F I G. 19

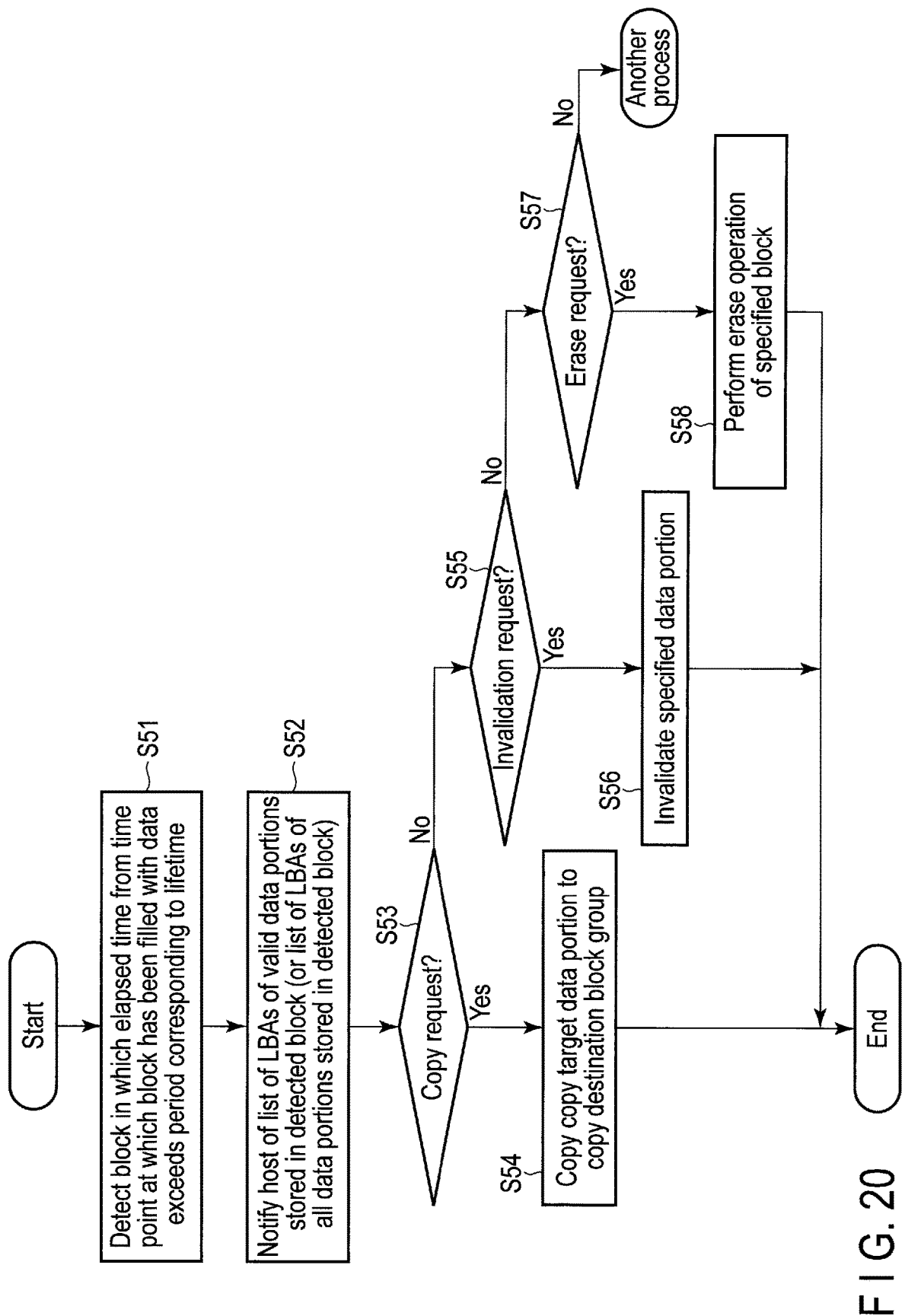
F I G. 20

MEMORY SYSTEM WITH CONTROLLER TO WRITE DATA TO MEMORY BASED ON LIFETIME INFORMATION IN WRITE COMMAND

CROSS-REFERENCE TO RELATED APPLICATIONS

This application is a continuation of and claims benefit under 35 U.S.C. § 120 to U.S. application Ser. No. 17/684,647, filed Mar. 2, 2022, which is a continuation of and claims benefit under 35 U.S.C. § 120 to U.S. application Ser. No. 16/815,547, filed Mar. 11, 2020, which is based upon and claims the benefit of priority under 35 U.S.C. § 119 from Japanese Patent Application No. 2019-157078, filed Aug. 29, 2019, the entire contents of each of which are incorporated herein by reference.

FIELD

Embodiments described herein relate generally to a technique for controlling a nonvolatile memory.

BACKGROUND

In recent years, memory systems comprising nonvolatile memories have become widespread.

As one of the above memory systems, a solid-state drive (SSD) based on NAND flash technology has been known. The SSD has been used as the storage of various computers.

Recently, an attempt to improve the performance of the SSD by the control from a host has started.

To improve the performance of the SSD, a new function for providing a host with information useful for improving the performance needs to be realized.

BRIEF DESCRIPTION OF THE DRAWINGS

FIG. 1 is a block diagram illustrating the relationship between a host and a memory system according to an embodiment.

FIG. 5 illustrates a configuration example of a block group (super block) constructed by a set of a plurality of physical blocks.

FIG. 6 is a block diagram for explaining the operation of writing data having the same estimated lifetime into the same block, the operation of, when the elapsed time from the time point at which a block has been filled with write data exceeds a period, notifying the host of the identifier of each of the data portions stored in the block, and the operation of copying the data portions stored in the block to a block group for storing data having another estimated lifetime in response to a request from the host.

FIG. 7 is a diagram for explaining the operation of, when the elapsed time from the time point at which a block has been filled with write data exceeds a period, notifying the host of the identifier of each of the valid data portions stored in the block.

FIG. 8 is a diagram for explaining lifetime reestimation operation and data copy operation.

FIG. 10 is a diagram for explaining the operation of changing a block group in which data is stored from a block group for storing data having a short lifetime to a group block for storing data having a long lifetime.

FIG. 12 illustrates an example of a write command issued to the memory system of the embodiment.

FIG. 13 illustrates an example of an address recording request indicated from the memory system of the embodiment to the host.

FIG. 14 illustrates an example of a read command issued to the memory system of the embodiment.

FIG. 15 illustrates an example of a copy command issued to the memory system of the embodiment.

FIG. 16 illustrates copy operation performed in the memory system of the embodiment.

FIG. 17 illustrates an example of an erase command issued to the memory system of the embodiment.

FIG. 18 illustrates an example of a trim command issued to the memory system of the embodiment.

FIG. 19 is a flowchart illustrating the procedure of write operation performed in the memory system of the embodiment.

FIG. 20 is a flowchart illustrating copy operation and invalidation operation performed in the memory system of the embodiment.

DETAILED DESCRIPTION

Figure 2:
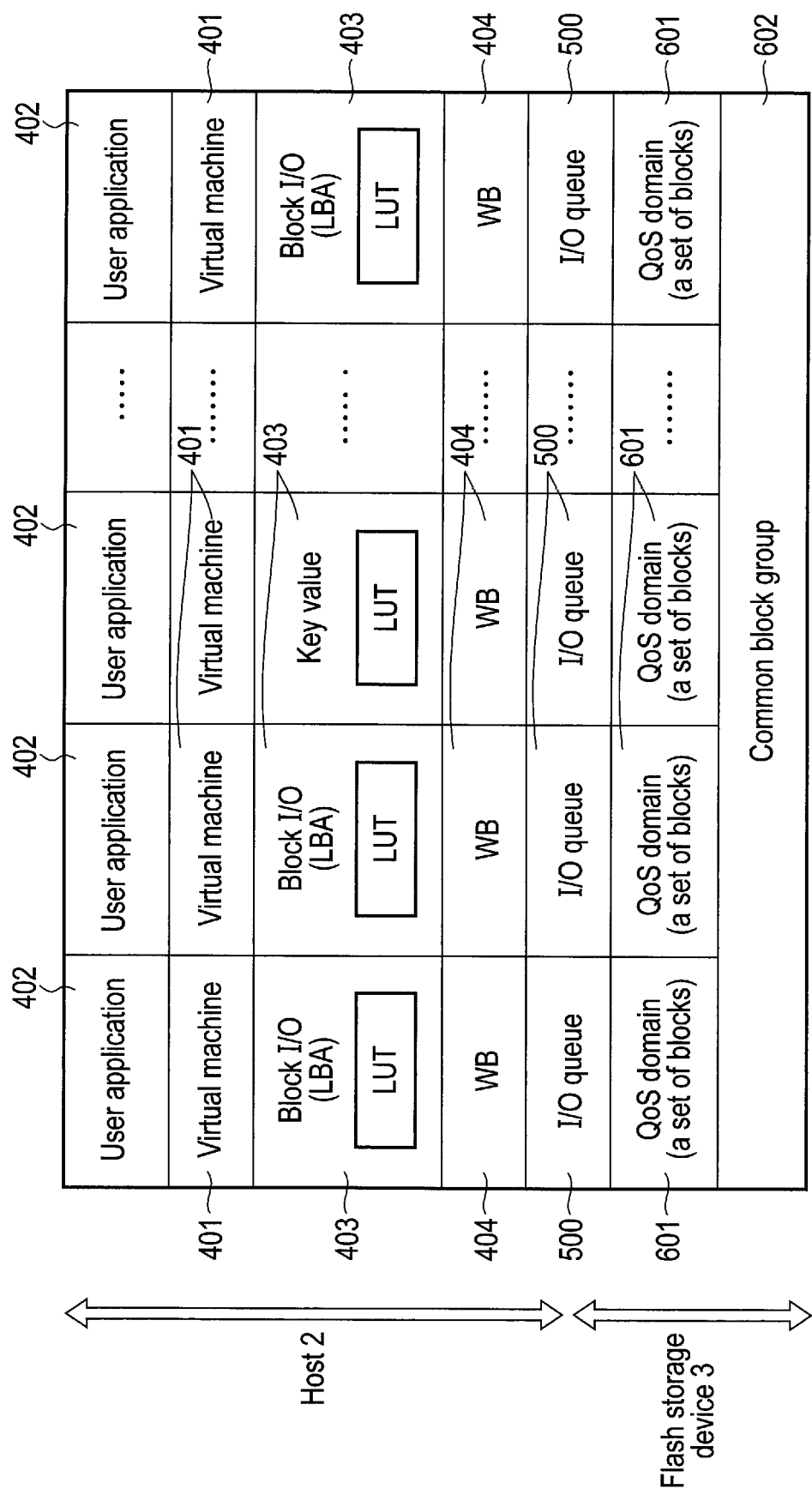
FIG. 2 is a diagram for explaining role-sharing between the memory system of the embodiment and the host.

Various embodiments will be described hereinafter with reference to the accompanying drawings.

In general, according to one embodiment, a memory system connectable to a host, comprises a nonvolatile memory including a plurality of blocks, and a controller electrically connected to the nonvolatile memory and configured to receive a write command from the host, the write command including lifetime information capable of identifying a period to which an estimated lifetime of write data belongs.

When the period identified by the lifetime information of the received write command is a first period, the controller writes the write data into a first write destination block allocated for a first block group for storing data having an estimated lifetime corresponding to the first period. When the first write destination block is filled with the write data, the controller manages the first write destination block as a block in which a valid data portion is stored and which belongs to the first block group, and allocates a new first write destination block for the first block group.

When the period identified by the lifetime information of the received write command is a second period longer than the first period, the controller writes the write data into a second write destination block allocated for a second block group for storing data having an estimated lifetime corresponding to the second period. When the second write destination block is filled with the write data, the controller manages the second write destination block as a block in which a valid data portion is stored and which belongs to the second block group, and allocates a new second write destination block for the second block group.

The controller detects, of blocks in which valid data portions are stored and which belong to the first block group, a first block in which an elapsed time from a time point at which the block has been filled with the write data exceeds the first period. The controller notifies the host of a list of identifiers capable of identifying valid data portions stored in the first block or a list of identifiers capable of identifying all data portions stored in the first block. When receiving, from the host, a first copy request specifying one or more valid data portions stored in the first block as copy target data and specifying the second block group as a copy destination block group, the controller copies the one or more valid data portions specified as the copy target data from the first block to the second block group.

This specification explains the relationship between a memory system and a host according to an embodiment with reference to FIG. 1.

The memory system is a semiconductor storage device configured to write data into a nonvolatile memory and read data from the nonvolatile memory. The memory system is realized as a flash storage device 3 based on NAND flash technology.

A host (host device) 2 is configured to control a plurality of flash storage devices 3. The host 2 is realized by an information processing apparatus configured to use a flash array including a plurality of flash storage devices 3 as storage. The information processing apparatus may be a personal computer or a server computer.

Each flash storage device 3 may be utilized as one of a plurality of flash storage devices provided in a storage array. The storage array may be connected to an information processing apparatus such as a server computer via a cable or a network. The storage array includes a controller which controls the storage devices (for example, the flash storage devices 3) in the storage array. When the flash storage devices 3 are applied to the storage array, the controller of the storage array may function as the host of the flash storage devices 3.

Each flash storage device 3 may be realized as a first type storage device configured to manage mapping between each logical address used by the host 2 to access the flash storage device 3 and each physical address of the nonvolatile memory in the flash storage device 3 by using a lookup table which functions as an address translation tablet. A logical block address (LBA) is used as a logical address.

When each flash storage device 3 is realized as the first type storage device, the flash storage device 3 receives a write request specifying the logical address of write target data from the host 2. The flash storage device 3 determines the physical storage location (block and page) of the nonvolatile memory into which write data associated with the received write request should be written, writes the write data into the determined physical storage location, and associates the physical address (block address and in-block offset) indicative of the physical storage location in which the write data is written with the logical address by updating the lookup table. The in-block offset may be represented by the page address of a page and an offset within the page.

When each flash storage device 3 is realized as the first type storage device, the flash storage device 3 receives a read request specifying the logical address of read target data and the length of the read target data from the host 2. The flash storage device 3 obtains the physical address indicative of the physical storage location of the nonvolatile memory in which data corresponding to the logical address specified by the read request is stored by referring to the lookup table. The flash storage device 3 reads data corresponding to the logical address specified by the read request from the nonvolatile memory based on the obtained physical address.

Each flash storage device 3 may be realized as a second type storage device configured to notify the host 2 of a physical address.

When each flash storage device 3 is realized as the second type storage device, the flash storage device 3 may use an addressing scheme in which the method for specifying an address for writing is different from the method for specifying an address for reading.

In this addressing scheme, a read request received from the host 2 specifies the physical address (both the block address and the in-block offset) indicative of the physical storage location in the nonvolatile memory in which read target data is stored and the length of the read target data. The block address is the block address indicative of the block in the nonvolatile memory in which the read target data is stored. The in-block offset is indicative of the physical storage location in the block in which the read target data is stored. A write request received from the host 2 may specify the logical address of write target data and the length of the write target data. In this case, the flash storage device 3 determines both the write destination block and the write destination location in the write destination block. The flash storage device 3 notifies the host 2 of the physical address (block address and in-block offset) indicative of the physical storage location of the nonvolatile memory in which the write target data is written. The host 2 updates the lookup table and maps the physical address indicated by the SSD 3 to the logical address of the write target data.

When each flash storage device 3 is realized as the second type storage device, a write request received from the host 2 may specify the logical address of write target data, the block address of the write destination block and the length of the write target data. In this case, the flash storage device 3 determines only the write destination location in this write destination block. The flash storage device 3 notifies the host 2 of the physical address (block address and in-block offset) indicative of the physical storage location of the nonvolatile memory in which the write target data is written. The host 2 updates the lookup table and maps the physical address indicated by the SSD 3 to the logical address of the write target data.

In each of the first type storage device and the second type storage device, in place of the logical address of write/read target data, a key of a key-value store or the hash value of this key, etc., may be used as an identifier capable of identifying write/read target data.

Hereinafter, mainly, it is assumed that each flash storage device 3 is realized as the second type storage device. It is also assumed that an information processing apparatus such as a server computer functions as the host 2 for issuing a write/read request (write/read command) to the flash storage devices 3.

The host (server) 2 and a plurality of flash storage devices 3 are interconnected (internally interconnected) via an interface 50. As the interface 50 for interconnection, for example, a PCI Express (PCIe) (registered trademark), NVM Express (NVMe) (registered trademark), Ethernet (registered trademark) or NVMe over Fabrics (NVMeOF) may be used. However, the interface 50 for interconnection is not limited to these examples.

A typical example of the server computer which functions as the host 2 is a server computer (hereinafter, referred to as a server) in a data center.

In the case where the host 2 is realized by a server in a data center, the host (server) 2 may be connected to a plurality of end user terminals (clients) 61 via a network 60. The host 2 is capable of providing the end user terminals 61 with various services.

Examples of the services provided by the host (server) 2 include, for example, (1) a Platform as a Service (PaaS) which provides each client (end user terminal 61) with a system running platform and (2) an Infrastructure as a Service (IaaS) which provides each client (end user terminal 61) with an infrastructure such as a virtual server.

A plurality of virtual machines may be run on the physical server which functions as the host (server) 2. Each of the virtual machines running on the host (server) 2 is capable of functioning as a virtual server configured to provide a client (end user terminal 61) corresponding to the virtual machine with various services. In each virtual machine, an operating system and a user application used by an end user terminal 61 corresponding to the virtual machine are executed.

In the host (server) 2, a flash translation layer (host FTL) may be executed. The host FTL includes a lookup table (LUT) which is an address translation tablet for managing mapping between each identifier (tag) for identifying access target data and each physical address of the nonvolatile memory in each flash storage device 3. The host FTL is capable of recognize data placement on the nonvolatile memory in each flash storage device 3 by using the LUT.

Each flash storage device 3 includes a nonvolatile memory such as a NAND flash memory. The nonvolatile memory includes a plurality of blocks each of which includes a plurality of pages. Each of these blocks is a unit of erasing data. Each of the pages is a unit of writing and reading data.

Each flash storage device 3 is capable of executing low-level abstraction. The low-level abstraction is a function for the abstraction of the nonvolatile memory. The low-level abstraction includes a function of assisting data placement, etc. Examples of a function of assisting data placement may include a function of allocating the write destination block into which user data from the host 2 should be written, a function of determining the write destination location (the write destination block and the location in the write destination block) of user data, a function of notifying an upper layer (host 2) of the write destination location (block address and in-block offset) in which user data is written, etc.

Each flash storage device 3 executes various commands received from the host 2. These commands include a write command for writing data into the nonvolatile memory in the flash storage device 3, and a read command for reading data from the nonvolatile memory. In the present embodiment, each read command specifies the physical address indicative of the storage location in which the data to be read is stored. The physical address is represented by the block address of the read target block and the offset (in-block offset) indicative of the read target storage location in the read target block.

Each flash storage device 3 receives each read command specifying the block address of the read target block and the offset indicative of the read target storage location in the read target block from the host 2, and performs data read operation in accordance with the received read command.

FIG. 2 illustrates role sharing between the flash storage device 3 and the host 2.

In the host (server) 2, a plurality of virtual machines 401 corresponding to a plurality of end users, respectively, are executed. In each virtual machine 401, an operating system and a user application 402 used by a corresponding end user are executed.

In the host (server) 2, a plurality of I/O services 403 corresponding to a plurality of user applications 402, respectively, are executed. The I/O services 403 may include a logical block address (LBA)-based block I/O service, a key-value store service and the like. Each of the I/O services 403 includes a lookup table (LUT) which manages mapping between each tag and each physical address of the flash storage device 3.

The tag is indicative of an identifier which can identify access target data. A typical example of the tag is a logical address such as an LBA although the tag is not limited to this example. Alternatively, a user address (for example, a key of a key-value store, or the hash value of the key) may be used as the tag.

The physical address of the flash storage device 3 is an address for specifying the storage location (physical storage location) in the nonvolatile memory included in the flash storage device 3.

In the LBA-based block I/O service, an LUT which manages mapping between each logical address (LBA) and each physical address of the flash storage device 3 may be used.

In the key-value store service, an LUT which manages mapping between each of keys (or the hash value of each key), each of physical addresses of the flash storage device 3 in which data corresponding to these key are stored, and the data length of data corresponding to each of these keys may be used.

Each end user can select the addressing method (an LBA, a key of a key-value store, the hash value of the key, etc.,) which should be used.

In the host (server) 2, a plurality of write buffers (WBs) 404 corresponding to a plurality of virtual machines 401, respectively, may be managed. Write data from a user application 402 may be temporarily stored in the write buffer (WB) 404 for a virtual machine 401 corresponding to the user application 402.

Transmission of a command from the host (server) 2 to the flash storage device 3 and return of a response of command completion, etc., from the flash storage device 3 to the host (server) 2 are executed via an I/O queue 500 which is present in each of the host (server) 2 and the flash storage device 3.

The flash storage device 3 is capable of managing each of a plurality of areas obtained by logically dividing the nonvolatile memory in the flash storage device 3 as a QoS domain 601. Each QoS domain 601 is a subset of a plurality of blocks included in the nonvolatile memory. Each of the blocks included in the nonvolatile memory belongs to only one QoS domain 601. The same block does not simultaneously belong to different QoS domains 601.

Each QoS domain 601 is identified by an identifier called a QoS domain ID. These QoS domain IDs are used as a plurality of identifiers for accessing the areas (QoS domains), respectively.

In the present embodiment, each write command specifies the tag of write data (for example, the LBA of write data)

and the length of the write data. When a write command specifying a tag such as an LBA and the length of write data is received from the host 2, the flash storage device 3 selects a block from a group of free blocks and allocates the selected block as a write destination block. In the case where the flash storage device 3 is configured to manage a plurality of QoS domains 601, a common block group 602 shared by the QoS domains 601 may be used as a group of free blocks.

The write destination block is indicative of the block into which data should be written. The write destination block may be a single physical block, or a block group including a set of a plurality of physical blocks. Each block group is also called a super block. Each block group includes, for example, a plurality of physical blocks selected from different nonvolatile memory dies (also referred to as nonvolatile memory chips). Thus, it is possible to write data into a plurality of physical blocks belonging to a block group in parallel, and it is possible to read data from these physical blocks in parallel.

Each free block is indicative of a block in a state (free state) where it can be reused (reallocated) as a new write destination block. A typical example of a free block is a block (physical block or super block) in which valid data is not stored. Valid data is indicative of the latest data associated with a tag such as an LBA. In other words, data linked as the latest data from the LUT (logical-to-physical address translation tablet) of the host 2 is valid data. Invalid data is indicative of data which is not associated with a tag such as an LBA. Data which is not linked from the LUT of the host 2 is invalid data. For example, when updated data corresponding to an LBA is written into the flash storage device 3, previous data corresponding to the LBA becomes invalid data.

When data associated with a received write command is written into a write destination block, the flash storage device 3 transmits the tag of the data, the length of the data and the physical address (block address and in-block offset) indicative of the physical storage location in which the data is written to the host 2 as an address recording request. The address recording request is used as a physical address notification message for notifying the host 2 of the physical address (block address and in-block offset) indicative of the physical storage location in which the data is written.

The block address is an address for identifying the write destination block. The in-block offset is indicative of the physical storage location in the write destination super block in which the data is written.

In accordance with the address recording request, the host 2 is capable of updating the LUT such that the physical address (block address and in-block offset) can be associated with the tag of the data such as an LBA.

Figure 3:
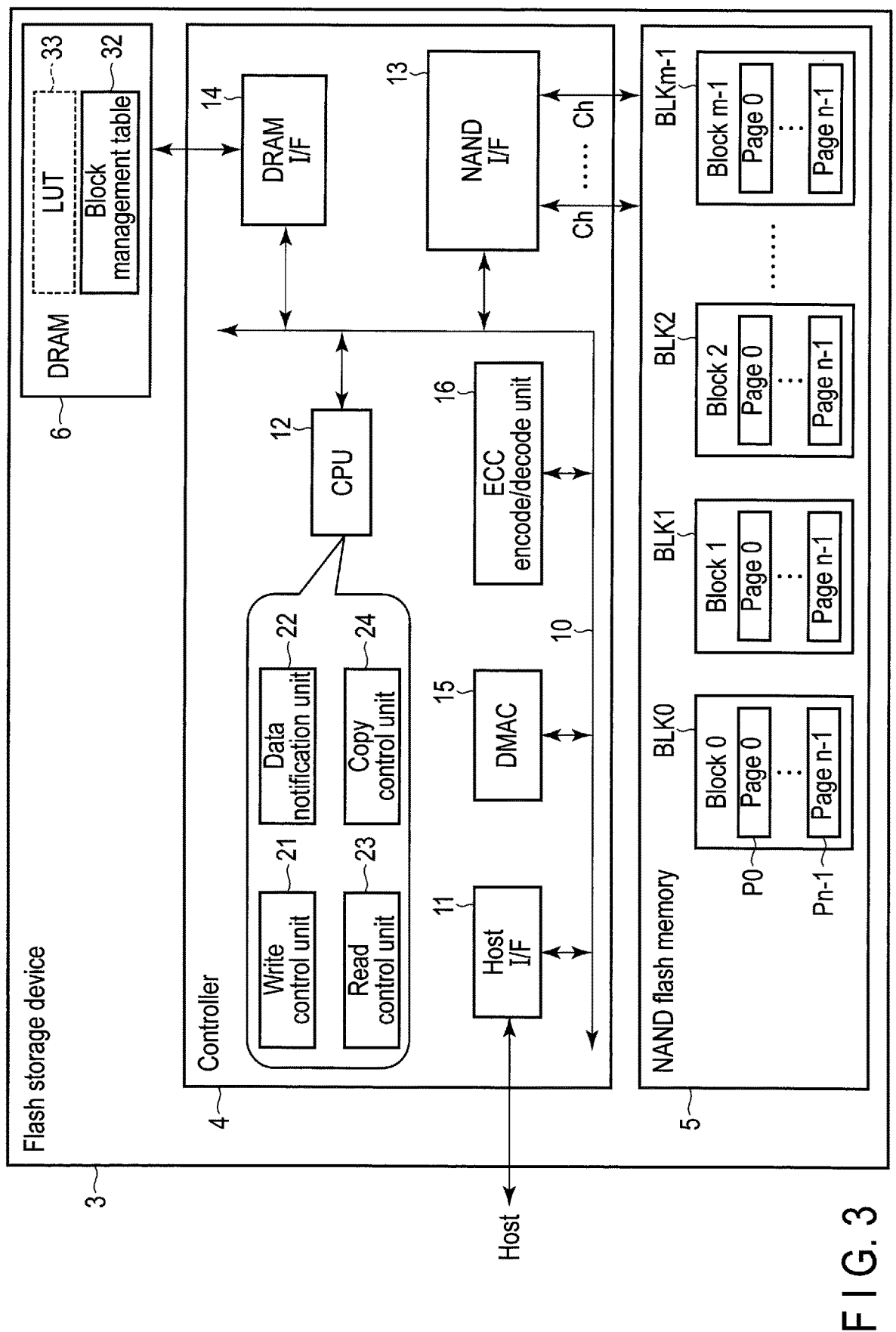
FIG. 3 is a block diagram illustrating a configuration example of the memory system of the embodiment.

FIG. 3 illustrates a configuration example of the flash storage device 3.

The flash storage device 3 comprises a controller 4 and a nonvolatile memory (NAND flash memory) 5. The flash storage device 3 may comprise a random access memory such as a DRAM 6.

The NAND flash memory 5 includes a memory cell array including a plurality of memory cells arrayed in matrix. The NAND flash memory 5 may be either a flash memory comprising a two-dimensional structure or a flash memory comprising a three-dimensional structure.

The memory cell array of the NAND flash memory 5 includes a plurality of blocks BLK0 to BLKm−1. Each of blocks BLK0 to BLKm−1 includes a plurality of pages (here, pages P0 to Pn−1). Blocks BLK0 to BLKm−1 function as erase units. Blocks may be called erase blocks, physical blocks or physical erase blocks. Pages P0 to Pn−1 are the units of data write operation and data read operation.

The controller 4 is electrically connected to the NAND flash memory 5 which is a nonvolatile memory via a NAND interface 13 such as a Toggle NAND flash interface and an open NAND flash interface (ONFI). The controller 4 operates as a memory controller configured to control the NAND flash memory 5. The controller 4 may be realized by a circuit such as a System-on-a-chip (SoC).

Figure 4:
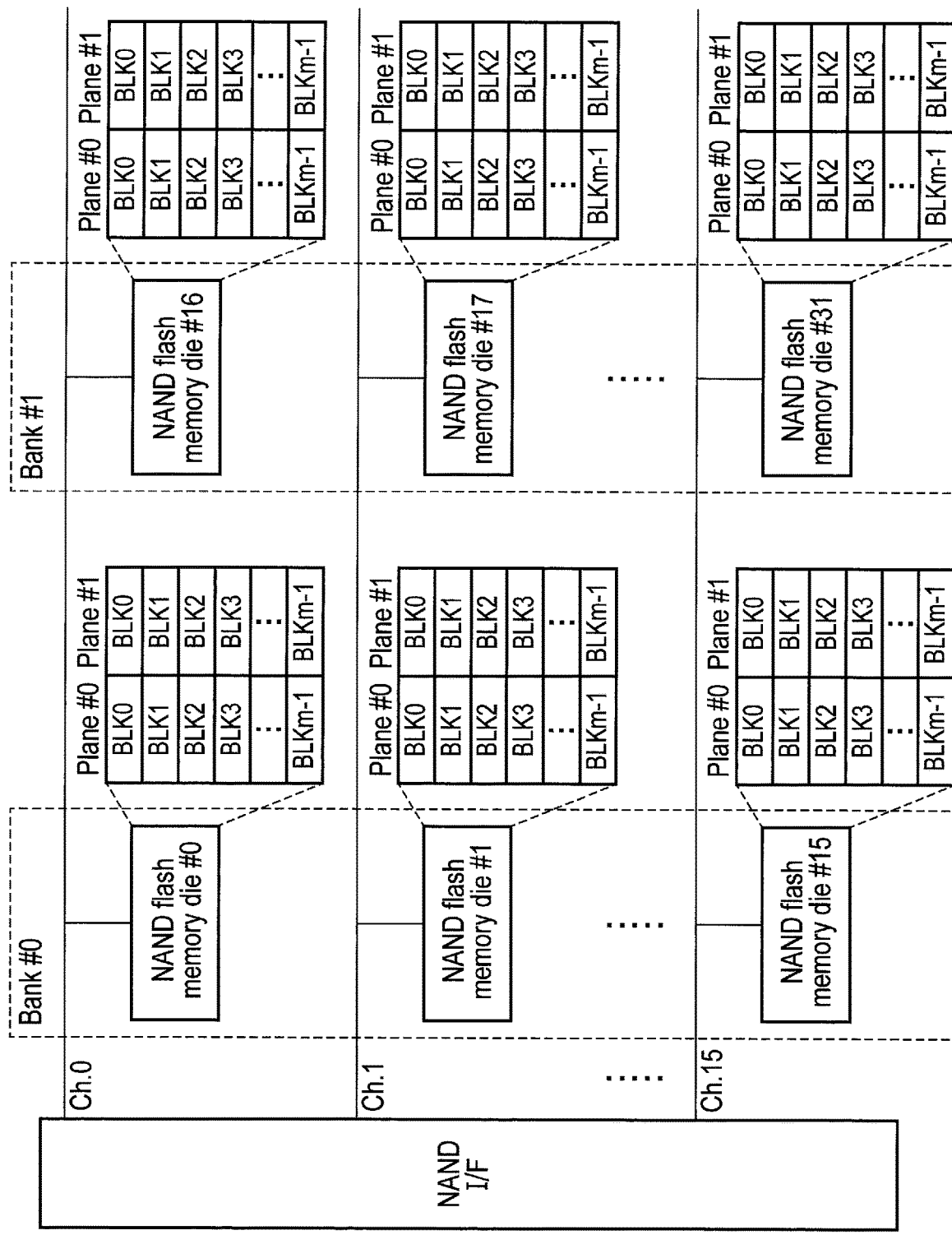
FIG. 4 is a block diagram illustrating the relationship between a NAND interface and a plurality of NAND flash memory chips in the memory system of the embodiment.

As shown in FIG. 4, the NAND flash memory 5 may include a plurality of NAND flash memory dies (NAND flash memory chips). Each NAND flash memory die is independently operable. Thus, the NAND flash memory dies function as parallel operational units. FIG. 4 illustrates a case where 16 channels Ch.0 to Ch.15 are connected to the NAND interface 13, and two NAND flash memory dies are connected to each of 16 channels Ch.0 to Ch.15. In this case, 16 NAND flash memory dies #0 to #15 connected to channels Ch.0 to Ch.15 may be organized as bank #0. The remaining 16 NAND flash memory dies #16 to #31 connected to channels Ch.0 to Ch.15 may be organized as bank #1. The banks function as the units of causing a plurality of memory modules to operate in parallel by bank interleaving. In the configuration example of FIG. 4, up to 32 NAND flash memory dies can be operated in parallel by 16 channels and bank interleaving using two banks.

Erase operation may be performed for either each physical block or each super block including a set of physical blocks which are operable in parallel. Each super block may include 32 physical blocks in total selected from NAND flash memory dies #0 to #31 one by one although the configuration is not limited to this example. Each of NAND flash memory dies #0 to #31 may comprise a multiplane structure. For example, when each of NAND flash memory dies #0 to #31 comprises a multiplane structure including two planes (plane #0 and plane #1), the total number of planes included in the NAND flash memory 5 is 64. Each super block may include 64 physical blocks in total selected from the 64 planes included in the NAND flash memory 5 one by one.

Figure 5:
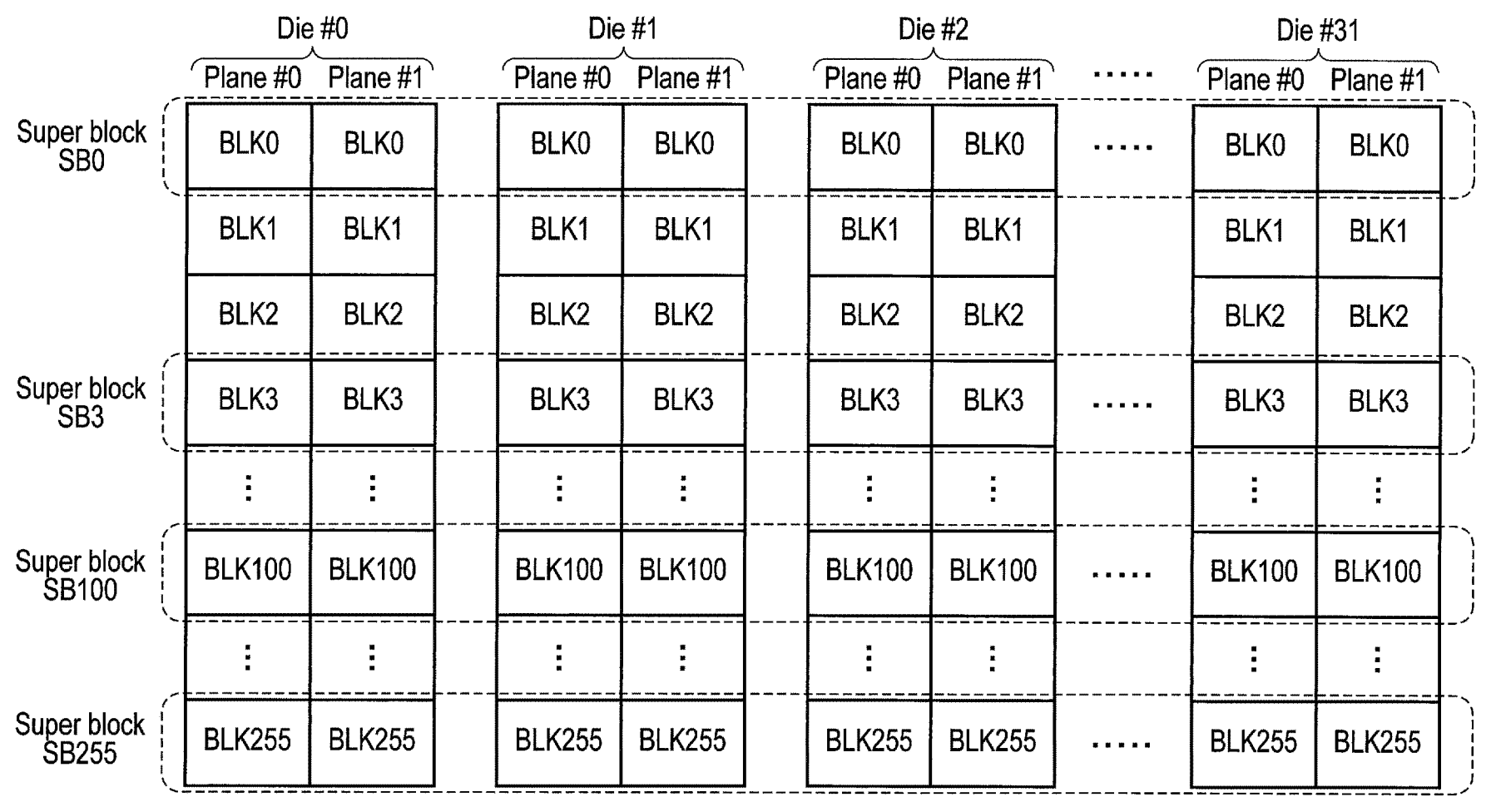

FIG. 5 illustrates a configuration example of some super blocks SB.

Super block SB0 having super block address 0 comprises physical block BLK0 included in plane #0 of NAND flash memory die #0 (die #0) and having block address 0, physical block BLK0 included in plane #1 of NAND flash memory die #0 (die #0) and having block address 0, physical block BLK0 included in plane #0 of NAND flash memory die #1 (die #1) and having block address 0, physical block BLK0 included in plane #1 of NAND flash memory die #1 (die #1) and having block address 0, physical block BLK0 included in plane #0 of NAND flash memory die #2 (die #2) and having block address 0, physical block BLK0 included in plan #1 of NAND flash memory die #2 (die #2) and having block address 0, . . . , physical block BLK0 included in plane #0 of NAND flash memory die #31 (die #31) and having block address 0, and physical block BLK0 included in plane #1 of NAND flash memory die #31 (die #31) and having block address 0.

Similarly, super block SB255 having super block address 255 comprises physical block BLK255 included in plane #0 of NAND flash memory die #0 (die #0) and having block address 255, physical block BLK255 included in plane #1 of NAND flash memory die #0 (die #0) and having block address 255, physical block BLK255 included in plane #0 of NAND flash memory die #1 (die #1) and having block address 255, physical block BLK255 included in plane #1 of NAND flash memory die #1 (die #1) and having block address 255, physical block BLK255 included in plane #0 of NAND flash memory die #2 (die #2) and having block address 255, physical block BLK255 included in plan #1 of NAND flash memory die #2 (die #2) and having block address 255, . . . , physical block BLK255 included in plane #0 of NAND flash memory die #31 (die #31) and having block address 255, and physical block BLK255 included in plane #1 of NAND flash memory die #31 (die #31) and having block address 255.

Now, this specification explains the configuration of the controller 4 of FIG. 3.

The controller 4 includes a host interface 11, a CPU 12, the NAND interface 13, a DRAM interface 14, a direct memory access controller (DMAC) 15, an ECC encode/decode unit 16, etc. The host interface 11, the CPU 12, the NAND interface 13, the DRAM interface 14, the DMAC 15 and the ECC encode/decode unit 16 are interconnected via a bus 10.

The host interface 11 is a host interface circuit configured to perform communication with the host 2. The host interface 11 may be, for example, a PCIe controller (NVMe controller). When the flash storage device 3 is connected to the host 2 via Ethernet (registered trademark), the host interface 11 may be an NVMe over Fabrics (NVMeOF) controller.

The host interface 11 receives various commands from the host 2. These commands include a write command, a read command, a copy command, an erase command, a trim command and other various commands.

The CPU 12 is a processor configured to control the host interface 11, the NAND interface 13, the DRAM interface 14, the DMAC 15 and the ECC encode/decode unit 16. The CPU 12 loads a control program (firmware) from the NAND flash memory 5 or a ROM (not shown) into the DRAM 6 when the flash storage device 3 is powered on, and performs various processes by running the firmware. The firmware may be loaded onto an SRAM (not shown) in the controller 4. The CPU 12 is capable of performing a command process for executing various commands from the host 2, etc. The operation of the CPU 12 is controlled by the firmware executed by the CPU 12. A command process may be partially or entirely performed by exclusive hardware in the controller 4.

The CPU 12 is capable of functioning as a write control unit 21, a data notification unit 22, a read control unit 23 and a copy control unit 24. A part of or the entire part of each of the write control unit 21, the data notification unit 22, the read control unit 23 and the copy control unit 24 may be realized by exclusive hardware in the controller 4.

The write control unit 21 is capable of processing a write command including lifetime information. The lifetime information is indicative of information which can identify the period to which the estimated lifetime of write data belongs. The lifetime of write data is indicative of the period from the time point at which write data is generated to the time point at which the data is invalidated by erasing or updating (rewriting) the data. The lifetime information included in a write command may be indicative of the time length of a period corresponding to the estimated lifetime of write data associated with the write command. Alternatively, in the case where the correspondence relationship between a plurality of periods and a plurality of identifiers associated with these periods is determined in advance, the lifetime information included in a write command may be an identifier associated with a period corresponding to the estimated lifetime of write data associated with the write command.

The write control unit 21 writes write data having the same estimated lifetime into the same write destination block, based on each write command including lifetime information. The write control unit 21 returns the physical address (block address and in-block offset) indicative of the storage location (physical storage location) of the NAND flash memory 5 in which the write data is written.

For example, when the period identified by the lifetime information included in a received write command is indicative of a first period (for example, a day), the write control unit 21 writes write data associated with the write command into a write destination block allocated for a first block group for storing data having an estimated lifetime corresponding to the first period (for example, a day). The write control unit 21 returns the physical address indicative of the storage location in the write destination block in which the write data is written to the host 2.

In this way, write data associated with each write command including lifetime information which can identify the first period (for example, a day) is written to the write destination block allocated for the first block group. When this write destination block is fully filled with write data, the write control unit 21 allocates a new write destination block for the first block group. The state of the write destination block filled with write data is changed from an opened state to a closed state. This write destination block is managed by the controller 4 as an active block including valid data and belonging to the first block group.

In other words, each block used as a write destination block for the first block group is managed by the controller 4 as an active block including valid data and belonging to the first block group. Regarding each block which was used as a write destination block for the first block group, when the elapsed time from the time point at which the block has been fully filled with write data exceeds the first period (for example, a day), there is a high possibility that all the data in the block is invalidated by erasing or updating (rewriting) the data. Regarding a block in which all the data has been invalidated, the block can be caused to be a free block by only applying erase operation to the block without executing garbage collection for copying valid data to another block. For example, in the case where the host 2 manages the validity/invalidity of the data portions in each block by using the host FTL, at the time point when all the data portions in an active block is invalidated by erasing or updating (rewriting) the data, the host 2 may transmit a command (erase command) for releasing the active block as a free block to the flash storage device 3. In the case where the flash storage device 3 manages the validity/invalidity of the data portions in each block, at the time point when all the data portions in an active block is invalidated by erasing or updating (rewriting) the data, the flash storage device 3 may automatically perform operation for releasing the active block as a free block.

In this way, it is possible to reduce the frequency necessary for executing garbage collection for copying only valid data from a block having both valid data and invalid data to another block, thereby minimizing the write amplification of the flash storage device 3.

For example, when the period identified by the lifetime information included in a received write command is a second period (for example, three days), the write control unit 21 writes write data associated with the write command into a write destination block allocated for a second block group for storing data having an estimated lifetime corresponding to the second period (for example, three days). The write control unit 21 returns the physical address indicative of the storage location in the write destination block in which the write data is written to the host 2.

In this way, write data associated with each write command including lifetime information which can identify the second period (for example, three days) is written to the write destination block allocated for the second block group. When this write destination block is fully filled with write data, the write control unit 21 allocates a new write destination block for the second block group. The state of the write destination block filled with write data is changed from an opened state to a closed state. This write destination block is managed by the controller 4 as an active block including valid data and belonging to the second block group.

In other words, each block which was used as a write destination block for the second block group is managed by the controller 4 as an active block including valid data and belonging to the second block group. Regarding each block which was used as a write destination block for the second block group, when the elapsed time from the time point at which the block has been fully filled with write data exceeds the second period (for example, three days), there is a high possibility that all the data in the block is invalided by erasing or updating (rewriting) the data. Regarding a block in which all the data has been invalidated, the block can be caused to be a free block by only applying erase operation to the block without executing garbage collection for copying valid data to another block.

For example, when the period identified by the lifetime information included in a received write command is a third period (for example, seven days), the write control unit 21 writes write data associated with the write command into a write destination block allocated for a third block group for storing data having an estimated lifetime corresponding to the third period (for example, seven days). The write control unit 21 returns the physical address indicative of the storage location in the write destination block in which the write data is written to the host 2.

In this way, write data associated with each write command including lifetime information which can identify the third period (for example, seven days) is written into the write destination block allocated for the third block group. When this write destination block is fully filled with write data, the write control unit 21 allocates a new write destination block for the third block group. The state of the write destination block filled with write data is changed from an opened state to a closed state. This write destination block is managed by the controller 4 as an active block including valid data and belonging to the third block group.

In other words, each block which was used as a write destination block for the third block group is managed by the controller 4 as an active block including valid data and belonging to the third block group. Regarding each block which was used as a write destination block for the third block group, when the elapsed time from the time point at which the block has been fully filled with write data exceeds the third period (for example, seven days), there is a high possibility that all the data in the block is invalided by erasing or updating (rewriting) the data. Regarding a block in which all the data has been invalidated, the block can be caused to be a free block by only applying erase operation to the block without executing garbage collection for copying valid data to another block.

The actual lifetime of data may be changed. Therefore, even if the host 2 determined data as data having a lifetime belonging to the first period (for example, a day) of a plurality of periods by the previous estimation of lifetime, the actual lifetime of the data may longer than the first time.

In this case, write amplification may be reduced when the data is dealt with as data having a lifetime belonging to a period (for example, three or seven days) longer than the first period rather than continuously dealing with the data as data having a lifetime belonging to the first period (for example, a day).

Thus, for example, the data notification unit 22 detects, of the blocks (an active block group belonging to the first block group) used as write destination blocks for the first block group, a block in which the elapsed time from the time point at which the block has been filled with write data exceeds the first period (for example, a day). The detected block is a block which still has valid data even after the first period (for example, a day) passed.

The data notification unit 22 notifies the host 2 of a list of identifiers (for example, LBAs) which can identify the valid data portions stored in the detected block or a list of identifiers (for example, LBAs) which can identify all the data portions stored in the detected block.

In the case where the flash storage device 3 is realized as the first type storage device, as the controller 4 manages the validity/invalidity of the data portions stored in each block, the data notification unit 22 of the controller 4 is capable of notifying the host 2 of a list of identifiers (for example, LBAs) which can identify the valid data portions stored in the detected block.

In the case where the flash storage device 3 is realized as the second type storage device, the validity/invalidity of the data portions stored in each block is basically managed by the host 2. Thus, the data notification unit 22 of the controller 4 may notify the host 2 of a list of identifiers (for example, LBAs) which can identify all the data portions stored in the detected block.

Even in the case where the flash storage device 3 is realized as the second type storage device, the controller 4 is capable of managing the validity/invalidity of the data portions stored in each block based on each trim command received from the host 2. In this case, the controller 4 may notify the host 2 of a list of identifiers (for example, LBAs) which can identify the valid data portions stored in the detected block.

Based on the LBA list received from the flash storage device 3, the host 2 is capable of obtaining a chance to reestimate the lifetime of each data portion (valid data portion) stored in a block in which the elapsed time from the time point at which the block has been filled with write data exceeds the first period (for example, a day). Based on the result of the reestimation of the lifetime of each data portion, the host 2 is capable of transmitting, to the flash storage device 3, a copy request specifying one or more valid data portions stored in the block as copy target data and specifying a block group (for example, the second block group or the third block group) different from the first block group as the copy destination block group. In this way, data in which the actual lifetime is longer than the first period (for example, a day) can be restored in the same block as the block in which other data corresponding to a period longer than the first period is stored.

When a read command specifying a physical address (block address and in-block offset) is received from the host 2, the read control unit 23 reads data from the NAND flash memory 5 based on the block address and the in-block offset. The read target block is specified by the block address. The read target physical storage location in the block is specified by the in-block offset.

The copy control unit 24 receives, from the host 2, a copy request specifying one or more valid data portions stored in the detected block as copy target data and specifying the different second block group as the copy destination block group. Based on the received copy request, the copy control unit 24 copies one or more valid data portions specified as copy target data from the detected block to the block group specified as the copy destination block group. In this way, a data portion which exceeds the lifetime previously expected can be copied to a block group used for storing data having the same lifetime as the reestimated lifetime of the data portion.

After completing this copy operation, to cause the block to be a free block, the host 2 may transmit an erase command specifying the block to the flash storage device 3. Based on the receipt of the erase command, the controller 4 performs the erase operation of the block specified by the erase command and manages the block as a free block.

The NAND interface 13 is a memory control circuit configured to control the NAND flash memory 5 under the control of the CPU 12.

The DRAM interface 14 is a DRAM control circuit configured to control the DRAM 6 under the control of the CPU 12. The storage region of the DRAM 6 is used to store a block management table 32. The block management table 32 includes a plurality of management tables corresponding to a plurality of blocks in the NAND flash memory 5, respectively. Each management table is used to store the management information (metadata) for managing a block corresponding to the management table. The metadata may include the number of rewrites (the number of program/erase cycles) of the corresponding block, an opened/closed state, etc., although the configuration is not limited to this example. The metadata may include valid bit map data indicative of the validation/invalidation of each data portion stored in the corresponding block.

The opened/closed state is indicative of whether the block is in an opened state or a closed state. The opened state is indicative of a state where the block is in use as a write destination block. The closed state is indicative of a state where the block is filled with data and managed as an active block.

In the case where the flash storage device is realized as the first type storage device, the storage region of the DRAM 6 is used to store a lookup table (LUT) 33 which functions as an address translation tablet.

The DMAC 15 performs data transfer between the memory (write buffer) in the host 2 and the DRAM 6 (internal buffer) under the control of the CPU 12. When write data should be transferred from the write buffer of the host 2 to the internal buffer, the CPU 12 specifies the transfer source address indicative of the location on the write buffer, the data size and the transfer destination address indicative of the location on the internal buffer with respect to the DMAC 15.

When data should be written into the NAND flash memory 5, the ECC encode/decode unit 16 encodes (ECC-encodes) the write data to be written, thereby adding an error correction code (ECC) to the data. When data is read from the NAND flash memory 5, the ECC encode/decode unit 16 performs the error correction of the data (ECC decoding), using the ECC added to the read data.

FIG. 6 is a block diagram for explaining the operation of writing data having the same estimated lifetime into the same block, the operation of, when the elapsed time from the time point at which a block has been filled with write data exceeds a period, notifying the host 2 of the identifier of each of the data portions stored in the block, and the operation of copying the data portions stored in the block to a block group for storing data having another estimated lifetime in response to a request from the host 2.

The host 2 includes a lifetime estimation unit 201. The lifetime estimation unit 201 estimates the lifetime of the data to be written into the flash storage device 3, and classifies the estimated lifetime of the data into a plurality of lifetime groups (for example, group #1, group #2, group #3 and group #4) having periods different from each other. FIG. 6 illustrates a case where a period corresponding to group #1 is a day, and a period corresponding to group #2 is three days, and a period corresponding to group #3 is seven days, and a period corresponding to group #4 is a month.

When the estimated lifetime of the data to be written is less than or equal to a day, the lifetime estimation unit 201 classifies the data into group #1. In this case, the host 2 transmits a write command including lifetime information which can identify a period (here, a day) corresponding to group #1 to the flash storage device 3. The lifetime information may be indicative of a time length corresponding to a day. Alternatively, when the flash storage device 3 is notified of the correspondence relationship between group #1 and a period (a day) corresponding to group #1 in advance, the lifetime information may be indicative of an identifier associated with a period (a day) corresponding to group #1, for example, the identifier of group #1.

When the estimated lifetime of the data to be written is greater than a day and less than or equal to three days, the lifetime estimation unit 201 classifies the data into group #2. In this case, the host 2 transmits a write command including lifetime information which can identify a period (here, three days) corresponding to group #2 to the flash storage device 3. The lifetime information may be indicative of a time length corresponding to three days. Alternatively, when the flash storage device 3 is notified of the correspondence relationship between group #2 and a period (three days) corresponding to group #2 in advance, the lifetime information may be indicative of an identifier associated with a period (three days) corresponding to group #2, for example, the identifier of group #2.

When the estimated lifetime of the data to be written is greater than three days and less than or equal to seven days, the lifetime estimation unit 201 classifies the data into group #3. In this case, the host 2 transmits a write command including lifetime information which can identify a period (here, seven days) corresponding to group #3 to the flash storage device 3. The lifetime information may be indicative of a time length corresponding to seven days. Alternatively, when the flash storage device 3 is notified of the correspondence relationship between group #3 and a period (seven days) corresponding to group #3 in advance, the lifetime information may be indicative of an identifier associated with a period (seven days) corresponding to group #3, for example, the identifier of group #3.

When the estimated lifetime of the data to be written is greater than seven days and less than or equal to a month, the lifetime estimation unit 201 classifies the data into group #4. In this case, the host 2 transmits a write command including lifetime information which can identify a period (here, a month) corresponding to group #4 to the flash storage device 3. The lifetime information may be indicative of a time length corresponding to a period (here, a month) corresponding to group #4. Alternatively, when the flash storage device 3 is notified of the correspondence relationship between group #4 and a period (a month) corresponding to group #4 in advance, the lifetime information may be indicative of an identifier associated with a period (here, a month) corresponding to group #4, for example, the identifier of group #4.

In the flash storage device 3, a flash block pool including four block groups 41 to 44 corresponding to four groups (group #1 to group #4), respectively, is managed. Each free block is managed by a free block pool 45.

Block group 41 is a set of blocks for storing data having an estimated lifetime corresponding to the period (a day) of group #1. In the flash storage device 3, firstly, a free block is selected from the free block pool 45, and the selected free block is allocated as a write destination block for block group 41. Write data associated with each write command including lifetime information for identifying a period corresponding to group #1 is written into the write destination block allocated for block group 41. When this write destination block is fully filled with write data, in other words, when data is written into the last storage location (last page) of the write destination block, a free block is selected from the free block pool 45 again, and the selected free block is allocated as a new write destination block for block group 41. The state of the block filled with write data transitions from an opened state to a closed state, and the block is managed as an active block belonging to block group 41 and including valid data.

FIG. 6 illustrates a case where block BLK1, block BLK2, block BLK3, block BLK4, block BLK5, block BLK6, block BLK7 and block BLK8 are allocated as a write destination block for block group 41 in this order. Block BLK8 is the current write destination block for block group 41. Block BLK1 is the oldest block of the blocks used as a write destination block for block group 41.

Block group 42 is a set of blocks for storing data having an estimated lifetime corresponding to the period (three days) of group #2. In the flash storage device 3, a free block is selected from the free block pool 45, and the selected free block is allocated as a write destination block for block group 42. Write data associated with each write command including lifetime information for identifying a period corresponding to group #2 is written into the write destination block allocated for block group 42. When this write destination block is fully filled with write data, a free block is selected from the free block pool 45 again, and the selected free block is allocated as a new write destination block for block group 42. The state of the block filled with write data transitions from an opened state to a closed state, and the block is managed as an active block belonging to block group 42 and including valid data.

FIG. 6 illustrates a case where block BLK21, block BLK22, block BLK23, block BLK24, block BLK25 and block BLK26 are allocated as a write destination block for block group 42 in this order. Block BLK26 is the current write destination block for block group 42. Block BLK21 is the oldest block of the blocks used as a write destination block for block group 42.

Block group 43 is a set of blocks for storing data having an estimated lifetime corresponding to the period (seven days) of group #3. In the flash storage device 3, a free block is selected from the free block pool 45, and the selected free block is allocated as a write destination block for block group 43. Write data associated with each write command including lifetime information for identifying a period corresponding to group #3 is written into the write destination block allocated for block group 43. When this write destination block is fully filled with write data, a free block is selected from the free block pool 45 again, and the selected free block is allocated as a new write destination block for block group 43. The state of the block filled with write data transitions from an opened state to a closed state, and the block is managed as an active block belonging to block group 43 and including valid data.

FIG. 6 illustrates a case where block BLK31, block BLK32, block BLK33 and block BLK34 are allocated as a write destination block for block group 43 in this order. Block BLK34 is the current write destination block for block group 43. Block BLK31 is the oldest block of the blocks used as a write destination block for block group 43.

Block group 44 is a set of blocks for storing data having an estimated lifetime corresponding to the period (a month) of group #4. In the flash storage device 3, a free block is selected from the free block pool 45, and the selected free block is allocated as a write destination block for block group 44. Write data associated with each write command including lifetime information for identifying a period corresponding to group #4 is written into the write destination block allocated for block group 44. When this write destination block is fully filled with write data, a free block is selected from the free block pool 45 again, and the selected free block is allocated as a new write destination block for block group 44. The state of the block filled with write data transitions from an opened state to a closed state, and the block is managed as an active block belonging to block group 44 and including valid data.

FIG. 6 illustrates a case where block BLK41, block BLK42, block BLK43, block BLK44, block BLK45, block BLK46 and block BLK47 are allocated as a write destination block for block group 44 in this order. Block BLK47 is the current write destination block for block group 44. Block BLK41 is the oldest block of the blocks used as a write destination block for block group 44.

Regarding each of block group 41, block group 42 and block group 43, the controller 4 detects a block in which the elapsed time from the time point at which the block has been filled with write data exceeds a period (a day, three days or seven days) corresponding to the block group.

The elapsed time from the time point at which a block has been filled with write data is indicative of the elapsed time from the time point at which data has been written into the last storage location of the block. In the case where a write destination block is composed of a single physical block, the last storage location is the last page of the physical block. In the case where a write destination block is composed of, for example, a single super block, the last storage location is the last page of the last physical block of the physical blocks included in the super block. For example, in super block SB0 of FIG. 5, the last page of physical block BLK0 included in plane #1 of NAND flash memory die #31 (die #31) is the last storage location of super block SB0.

It is assumed that, in block group 41, the elapsed time from the time point at which block BLK1 has been filled with write data exceeds a period (a day) corresponding to block group 41.

In this case, to provide the host 2 with a chance to reestimate the lifetime of the valid data portions in block BLK1, the controller 4 notifies the host 2 of a list of LBAs of the valid data portions stored in block BLK1 or a list of LBAs of all the data portions stored in block BLK1.

Based on the LBA list indicated by the flash storage device 3, the host 2 reestimates the lifetime of each valid data portion stored in block BLK1 (that is, each valid data portion which exceeds a period corresponding to the lifetime previously estimated).

For example, when the reestimated new lifetime of a valid data portion stored in block BL1 is three days, the host 2 transmits, to the flash storage device 3, a copy request (copy command) specifying the valid data portion as copy target data and specifying block group 42 (for example, the current write destination block BLK26 of block group 42) as a copy destination block group.

For example, when the reestimated new lifetime of a valid data portion stored in block BL1 is seven days, the host 2 transmits, to the flash storage device 3, a copy request (copy command) specifying the valid data portion as copy target data and specifying block group 43 (for example, the current write destination block BLK34 of block group 43) as a copy destination block group.

For example, when the reestimated new lifetime of a valid data portion stored in block BL1 is a month, the host 2 transmits, to the flash storage device 3, a copy request (copy command) specifying the valid data portion as copy target data and specifying block group 44 (for example, the current write destination block BLK47 of block group 44) as a copy destination block group.

Based on the copy request received from the host 2, the controller 4 copies the valid data portion specified as copy target data by the copy request to the block group (block group 42, block group 43 or block group 44) specified as a copy destination block group by the copy request.

After completing the copy operation of the necessary valid data portions in block BLK1, the host 2 may transmit an erase command specifying block BLK1 to the flash storage device 3 to release block BLK1 as a free block. Based on the receipt of the erase command, the controller 4 performs erase operation for block BLK1 and manages block BLK1 by the free block pool 45. In other words, block BLK1 is moved to the free block pool 45.

When the host 2 determines that all the valid data portions specified by the LBA list are unnecessary data, the host 2 may immediately transmit an erase command specifying block BLK1 to the flash storage device 3 without transmitting a copy request to the flash storage device 3.

Similarly, for example, when, in block group 42, the elapsed time from the time point at which block BLK21 has been filled with write data exceeds a period (three days) corresponding to block group 42, the controller 4 notifies the host 2 of a list of the LBAs of the valid data portions stored in block BLK21 or a list of the LBAs of all the data portions stored in block BLK21.

For example, when, in block group 43, the elapsed time from the time point at which block BLK31 has been filled with write data exceeds a period (seven days) corresponding to block group 43, the controller 4 notifies the host 2 of a list of the LBAs of the valid data portions stored in block BLK31 or a list of the LBAs of all the data portions stored in block BLK31.

FIG. 7 is a diagram for explaining the operation of, when the elapsed time from the time point at which a block has been filled with write data exceeds a period, notifying the host 2 of the identifier of each of the valid data portions stored in the block.

It is assumed that the elapsed time from the time point at which block BLK1 belonging to block group 41 has been filled with write data exceeds a period (a day) corresponding to block group 41. It is also assumed that block BLK1 is composed of four pages from page 0 to page 3, and four data portions are stored in each page.

As illustrated in the upper part of FIG. 7, in page 0 of block BLK1, for example, data portion D1 corresponding to LBA11, data portion D2 corresponding to LBA12, data portion D3 corresponding to LBA21 and data portion D4 corresponding to LBA25 are stored. In page 1 of block BLK1, for example, data portion D5 corresponding to LBA31, data portion D6 corresponding to LBA32, data portion D7 corresponding to LBA33 and data portion D8 corresponding to LBA40 are stored. In page 2 of block BLK1, for example, data portion D9 corresponding to LBA51, data portion D10 corresponding to LBA52, data portion D11 corresponding to LBA61 and data portion D12 corresponding to LBA62 are stored. In page 3 of block BLK1, for example, data portion D13 corresponding to LBA71, data portion D14 corresponding to LBA72, data portion D15 corresponding to LBA73 and data portion D16 corresponding to LBA74 are stored. Each of these LBAs may be stored in block BLK1 together with a corresponding data portion.

The middle part of FIG. 7 illustrates a valid bit map (here, "1110100001001000") corresponding to block BLK1. In the valid bit map, each bit "1" is indicative that the data portion in a storage location corresponding to the bit is valid data. In the valid bit map, each bit "0" is indicative that the data portion in a storage location corresponding to the bit is invalid data.

The controller 4 detects each of valid data portion D1, valid data portion D2, valid data portion D3, valid data portion D5, valid data portion D10 and valid data portion D13 stored in block BLK1 by referring to the valid bit map "1110100001001000".

As illustrated in the lower part of FIG. 7, the controller 4 notifies the host 2 of a list of LBAs (LBA11, LBA12, LBA21, LBA31, LBA52 and LBA71) corresponding to valid data portion D1, valid data portion D2, valid data portion D3, valid data portion D5, valid data portion D10 and valid data portion D13, respectively.

In the case where the host 2 manages the validity/invalidity of each data portion, the controller 4 may notify the host 2 of a list of LBAs (LBA11, LBA12, LBA21, LBA25, LBA31, LBA32, LBA33, LBA40, LBA51, LBA52, LBA61, LBA62, LBA71, LBA72, LBA73 and LBA74) corresponding to all the data portions stored in block BLK1.

FIG. 8 is a diagram for explaining lifetime reestimation operation and data copy operation.

When the host 2 receives an LBA list from the flash storage device 3, the host 2 reestimates the lifetime of each valid data portion specified by the LBA list, thereby obtaining the new estimated lifetime of each valid data portion (step S11). The host 2 reclassifies these valid data portions into group #1 to group #4 based on the new estimated lifetime (reestimated lifetime) of each valid data portion, thereby determining a copy destination block group corresponding to each valid data portion (step S12). When a valid data portion to be copied to another block group is present, the host 2 transmits, to the flash storage device 3, a copy request specifying the valid data as copy target data and specifying a block group corresponding to the group into which the valid data is reclassified as a copy destination block group (step S13).

The copy target data may be specified by a copy source physical address. For example, when data D1 of block BLK1 illustrated in FIG. 7 is copy target data, the copy source physical address is represented by block address=BLK1, page address=0 and offset=0. The copy destination block group may be specified by the identifier identifying one of groups #2 to #4, or may be specified by the copy destination block address indicative of the copy destination block in the copy destination block group.

It is assumed that data D1 of block BLK1 is copied to the current write destination block BLK34 of block group 43. In this case, for example, a copy request specifying the copy source physical address (block address=BLK1, page address=0, offset=0) and the copy destination block address (block address=BLK34) may be transmitted from the host 2 to the flash storage device 3. Based on the receipt of this copy request, the flash storage device 3 reads data D1 from block BLK1 and writes the read data into block BLK34, thereby copying data D1 from block BLK1 to block BLK34 of block group 43.

When a plurality of valid data portions stored in block BLK1 are classified into different groups, the copy destination block groups to which these valid data portions should be copied are different from each other.

In the case where a valid data portion stored in block BLK1 is classified into group #1 again, copy operation for this valid data portion may not be performed, or the copy operation of copying the valid data portion to the current write destination block for block group 41 corresponding to group #1 may be performed.

Figure 9:
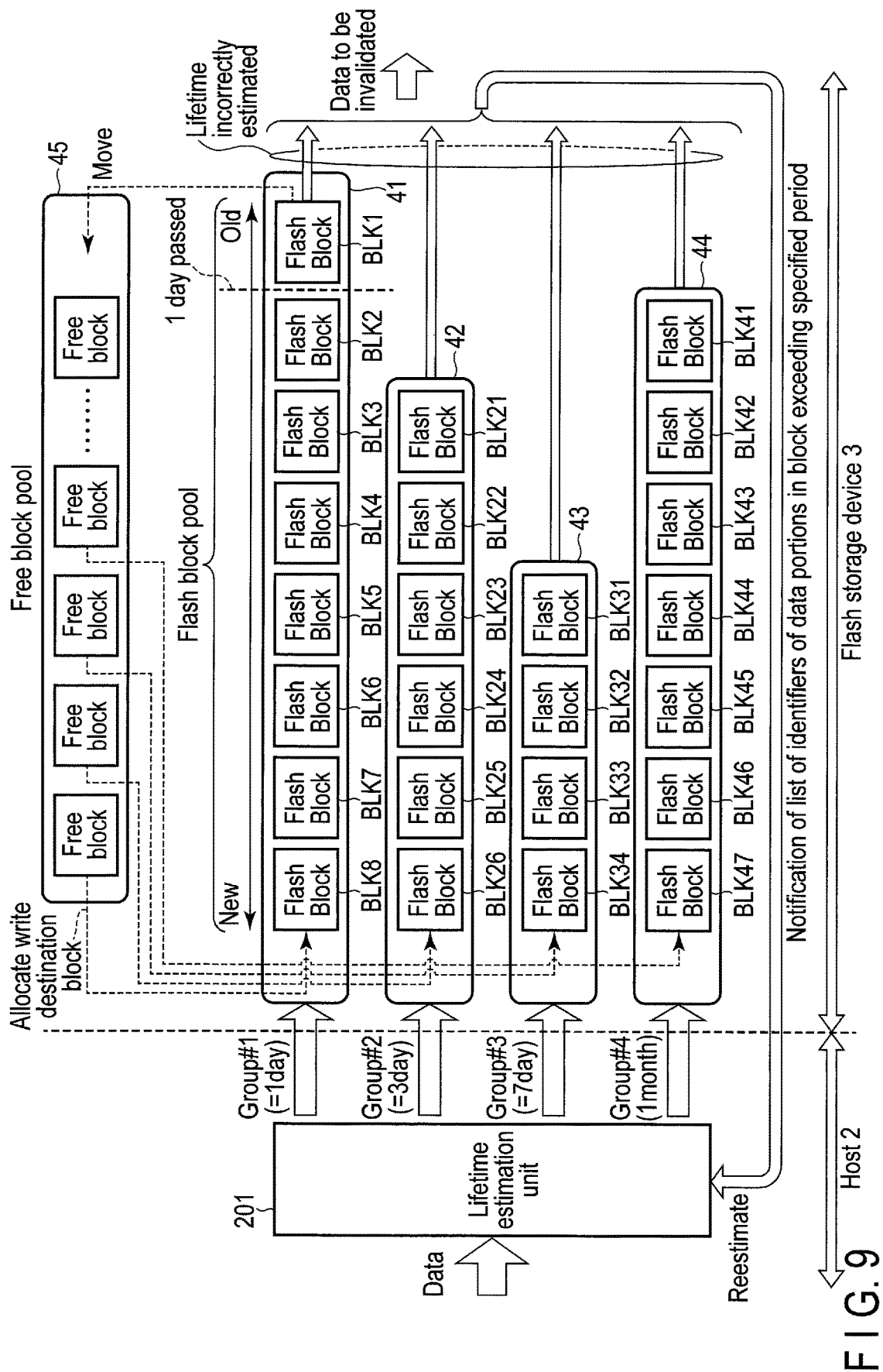
FIG. 9 is a block diagram for explaining the operation of writing data having the same estimated lifetime into the same block, the operation of, when the elapsed time from the time point at which a block has been filled with write data exceeds a period, notifying the host of the identifier of each of the data portions stored in the block, the operation of copying the data portions stored in the block to a block group for storing data having another estimated lifetime in response to a request from the host, and the operation of invalidating a data portion stored in the block in response to a request from the host.

FIG. 9 is a block diagram for explaining the operation of writing data having the same estimated lifetime to the same block, the operation of, when the elapsed time from the time point at which a block has been filled with write data exceeds a period, notifying the host 2 of the identifier of each of the data portions stored in the block, the operation of copying the data portions stored in the block to a block group for storing data having another estimated lifetime in response to a request from the host 2, and the operation of invalidating a data portion stored in the block in response to a request from the host.

When the host 2 receives an LBA list from the flash storage device 3, the host 2 is capable of requesting the flash storage device 3 to copy a data portion corresponding to a specific LBA included in the LBA list, and is also capable of requesting the flash storage device 3 to invalidate a data portion corresponding to another specific LBA included in the LBA list.

It is assumed that, in block group 41, the elapsed time from the time point at which block BLK1 has been filled with write data exceeds a period (a day) corresponding to block group 41. In this case, the controller 4 notifies the host 2 of a list of the LBAs of the valid data portions stored in block BLK1 or a list of the LBAs of all the data portions stored in block BLK1.

The host 2 reestimates the lifetime of each valid data portion stored in block BLK1. For example, when the reestimated new lifetime of a data portion stored in block BLK1 is three days, the host 2 transmits, to the flash storage device 3, a copy request (copy command) to copy the valid data portion from block BLK1 to block group 42 (for example, the current write destination block BLK26 of block group 42). When the host 2 determines that another valid data portion stored in block BLK1 is no longer necessary, the host 2 transmits an invalidation request (trim command) specifying the valid data portion as an invalidation target data portion to the flash storage device 3.

Based on the copy request received from the host 2, the controller 4 copies the data portion specified as copy target data by the copy request from block BLK1 to block group 42. Based on the invalidation request received from the host 2, the controller 4 invalidates the data portion in block BLK1 specified as invalidation target data by the invalidation request.

Similarly, for example, when, in block group 42, the elapsed time from the time point at which block BLK21 has been filled with write data exceeds a period (three days) corresponding to block group 42, the controller 4 notifies the host 2 of a list of the LBAs of the valid data portions stored in block BLK21 or a list of the LBAs of all the data portions stored in block BLK21.

The host 2 reestimates the lifetime of each valid data portion stored in block BLK21. For example, when the reestimated new lifetime of a data portion stored in block BLK21 is seven days, the host 2 transmits, to the flash storage device 3, a copy request (copy command) to copy the valid data portion from block BLK21 to block group 43 (for example, the current write destination block BLK34 of block group 43). When the host 2 determines that another valid data portion stored in block BLK21 is no longer necessary, the host 2 transmits an invalidation request (trim command) specifying the valid data portion as an invalidation target data portion to the flash storage device 3.

Similarly, for example, when, in block group 43, the elapsed time from the time point at which block BLK31 has been filled with write data exceeds a period (seven days) corresponding to block group 43, the controller 4 notifies the host 2 of a list of the LBAs of the valid data portions stored in block BLK31 or a list of the LBAs of all the data portions stored in block BLK31.

The host 2 reestimates the lifetime of each valid data portion stored in block BLK31. For example, when the reestimated new lifetime of a data portion stored in block BLK31 is a month, the host 2 transmits, to the flash storage device 3, a copy request (copy command) to copy the valid data portion from block BLK31 to block group 44 (for example, the current write destination block BLK47 of block group 44). When the host 2 determines that another valid data portion stored in block BLK31 is no longer necessary, the host 2 transmits an invalidation request (trim command) specifying the valid data portion as an invalidation target data portion to the flash storage device 3.

Similarly, for example, when, in block group 44, the elapsed time from the time point at which block BLK41 has been filled with write data exceeds a period (a month) corresponding to block group 44, the controller 4 notifies the host 2 of a list of the LBAs of the valid data portions stored in block BLK41 or a list of the LBAs of all the data portions stored in block BLK41.

FIG. 10 is a diagram for explaining the operation of changing a block group in which data is stored from a block group for storing data having a short lifetime to a group block for storing data having a long lifetime.

FIG. 10 assumes a case where the storage destination block group of each valid data portion is changed in the order of block group 41, block group 42, block group 43 and block group 44.

Firstly, each write data portion classified into a period (a day) corresponding to group #1 is written into the current write destination block of block group 41 corresponding to group #1. When this current write destination block is filled with write data, the current write destination block becomes an active block of block group 41. A new write destination block for block group 41 is allocated, and each subsequent write data portion classified into a period (a day) corresponding to group #1 is written into the new write destination block for block group 41.

Thus, data classified into a period (a day) corresponding to group #1 are stored in the active blocks (blocks BLK1 to BLK7) of block group 41.

Valid data in a block which belongs to block group 41 and in which the elapsed time from the time point at which the block has been filled with write data exceeds a day becomes a copy candidate. The host 2 reestimates the new lifetime of these valid data portions. When the reestimated lifetime of these valid data portions is three days, these valid data portions (the old data of group #1) are copied to the current write destination block of block group 42.

Thus, the old data of group #1 are stored in the blocks (blocks BLK21 to BLK26) of block group 42.

Valid data in a block which belongs to block group 42 and in which the elapsed time from the time point at which the block has been filled with write data exceeds three days becomes a copy candidate. The host 2 reestimates the new lifetime of these valid data portions. When the reestimated lifetime of these valid data portions is seven days, these valid data portions (the old data of group #2) are copied to the current write destination block of block group 43.

Thus, the old data of group #2 are stored in the blocks (blocks BLK31 to BLK34) of block group 43.

Valid data in a block which belongs to block group 43 and in which the elapsed time from the time point at which the block has been filled with write data exceeds seven days becomes a copy candidate. The host 2 reestimates the new lifetime of these valid data portions. When the reestimated lifetime of these valid data portions is a month, these valid data portions (the old data of group #3) are copied to the current write destination block of block group 44.

Thus, the old data of group #3 are stored in the blocks (blocks BLK41 to BLK47) of block group 44.

Figure 11:
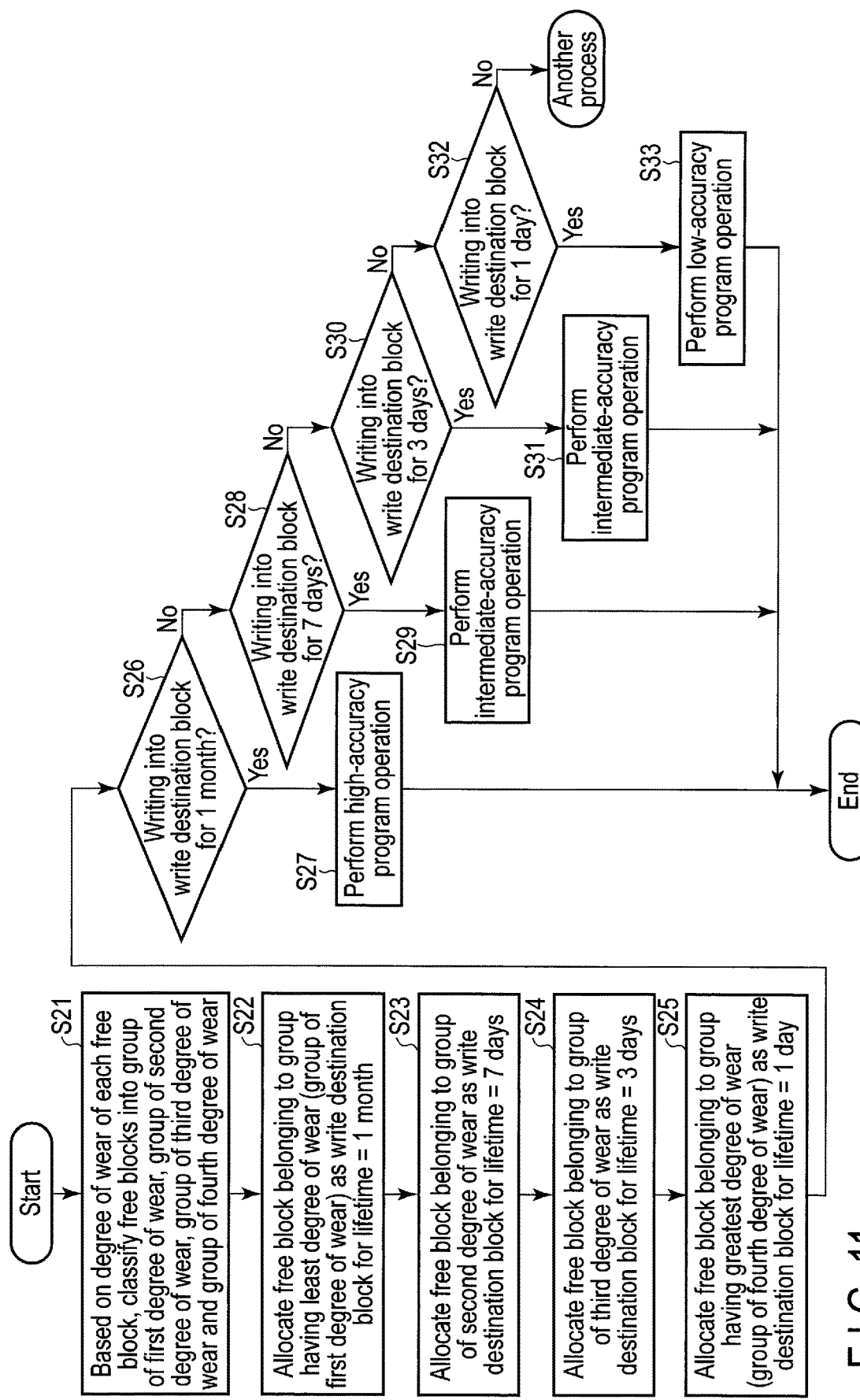
FIG. 11 is a flowchart illustrating the procedure of the operation of allocating a block in which the degree of wear is less to data having a long lifetime and allocating a block in which the degree of wear is great to data having a short lifetime, and the procedure of the operation of changing the accuracy of program operation based on the lifetime of the data to be written.

FIG. 11 is a flowchart illustrating the procedure of the operation of allocating a block in which the degree of wear is less to data having a long lifetime and allocating a block in which the degree of wear is great to data having a short lifetime, and the procedure of the operation of changing the accuracy of program operation based on the lifetime of the data to be written.

The data retention period of each block of the NAND flash memory 5 normally relies on the number of rewrites (the number of program/erase cycles) of the block. As the degree of wear of a block in which the number of rewrites is less is comparatively less, the block is capable of continuing to normally store data in a comparatively long period. As the degree of wear of a block in which the number of rewrites is great is comparatively great, the data retention period which is the period for continuing to normally store data may be comparatively short.

In consideration of the above matters, based on the number of rewrites (also referred to as the number of program/erase cycles) of each free block in the NAND flash memory 5, the controller 4 classifies the free blocks in the NAND flash memory 5 into a first free block group having a first degree of wear (the group of the first degree of wear), a second free block group having a second degree of wear greater than the first degree of wear (the group of the second degree of wear), a third free block group having a third degree of wear greater than the second degree of wear (the group of the third degree of wear) and a fourth free block group having a fourth degree of wear greater than the third degree of wear (the group of the fourth degree of wear) (step S21).

The controller 4 allocates a free block belonging to the group having the least degree of wear (the group of the first degree of wear) as a write destination block for block group 44 for storing data in which the lifetime is a month (step S22).

The controller 4 allocates a free block belonging to the group of the second degree of wear as a write destination block for block group 43 for storing data in which the lifetime is seven days (step S23).

The controller 4 allocates a free block belonging to the group of the third degree of wear as a write destination block for block group 42 for storing data in which the lifetime is three days (step S24).

The controller 4 allocates a free block belonging to the group having the greatest degree of wear (the group of the fourth degree of wear) as a write destination block for block group 41 for storing data in which the lifetime is a day (step S25).

In this way, write destination blocks having characteristics suitable for the data retention periods required for a plurality of block groups 41 to 44 can be allocated to block groups 41 to 44, respectively.

The controller 4 is capable of changing program operation for each block group as needed. Normally, when high-accuracy program operation for accurately setting the threshold voltage of a memory cell so as to be the target threshold voltage is performed, the data retention period of the memory cell is comparatively long. However, this program operation is time consuming. The time required for low-accuracy program operation for setting the threshold voltage of a memory cell so as to be the target threshold voltage with low accuracy is short. However, the data retention time of the memory cell is comparatively short.

Therefore, the controller 4 applies a plurality of types of program operations having different accuracies to block groups 41 to 44.

The controller 4 determines whether or not the period identified by the lifetime information of a write command received from the host 2 is a month (step S26).

When the period identified by the lifetime information of the received write command is a month (YES in step S26), the controller 4 writes write data associated with the write command into a write destination block allocated for block group 44, using high-accuracy program operation (step S27).

When the period identified by the lifetime information of the received write command is not a month (NO in step S26), the controller 4 determines whether or not the period identified by the lifetime information of the write command received from the host 2 is seven days (step S28).

When the period identified by the lifetime information of the received write command is seven days (YES in step S28), the controller 4 writes write data associated with the write command into a write destination block allocated for block group 43, using intermediate-accuracy program operation (step S29).

When the period identified by the lifetime information of the received write command is not seven days (NO in step S28), the controller 4 determines whether or not the period identified by the lifetime information of the write command received from the host 2 is three days (step S30).

When the period identified by the lifetime information of the received write command is three days (YES in step S30), the controller 4 writes write data associated with the write command into a write destination block allocated for block group 42, using intermediate-accuracy program operation (step S31).

When the period identified by the lifetime information of the received write command is not three days (NO in step S30), the controller 4 determines whether or not the period identified by the lifetime information of the write command received from the host 2 is a day (step S32).

When the period identified by the lifetime information of the received write command is a day (YES in step S32), the controller 4 writes write data associated with the write command into a write destination block allocated for block group 41, using low-accuracy program operation (step S33).

FIG. 12 illustrates a write command issued to the flash storage device 3.

A write command is a command to request the flash storage device 3 to write data. The write command may include a command ID, lifetime information, a tag, a length, a write buffer address, etc.

The command ID is the unique identifier of the command (here, the write command). The lifetime information is information for identifying a period corresponding to the lifetime of the write data to be written. The lifetime information may be indicative of the time length of a period corresponding to the lifetime of write data as described above. Alternatively, the lifetime information may be an identifier associated with the period.

The tag is an identifier for identifying the write data to be written. The tag may be a logical address such as an LBA or a user address (for example, a key of a key-value store or the hash value of the key) as described above.

The length is indicative of the size of the write data to be written. The write buffer address is indicative of the location in the memory (host memory) of the host 2 in which the write data to be written is stored. The write buffer address is also referred to as a data pointer.

FIG. 13 illustrates an address recording request transmitted from the flash storage device 3 to the host 2.

An address recording request is the above physical address notification message, and is used to notify the host 2 of the physical address indicative of the storage location (physical storage location) in the NAND flash memory 5 in which the write data associated with the write command is written. The address recording request may include a tag, a physical address (block address and offset) and a length.

The tag is the tag included in the write command of FIG. 12. The physical address is indicative of the physical storage location in which the write data associated with the write command is written. The physical address is represented by a block address and an in-block offset. The length is indicative of the length of the written write data.

FIG. 14 illustrates a read command issued to the flash storage device 3.

A read command is a command to request the flash storage device 3 to read data. The read command may include a command ID, a physical address, a length and a read buffer address.

The command ID is the unique identifier of the command (here, the read command). The physical address is indicative of the physical storage location in which the data to be read is stored. The physical address is represented by a block address and an in-block offset. The length is indicative of the size of the data to be read. The read buffer address is indicative of the location in the host memory to which the read data should be transferred.

FIG. 15 illustrates a copy command issued to the flash storage device 3.

A copy command is a command to request the flash storage device 3 to copy the data already written in the NAND flash memory 5 to another storage location in the NAND flash memory 5.

The copy command is used to copy the copy target data included in the copy source block having the source physical address specified by the host 2 to the block having the destination physical address specified by the host 2.

The copy command may include a command ID, a source physical address, a destination physical address and a bit map.

The command ID is the unique identifier of the copy command. The source physical address is indicative of the address of the copy source block in which the data to be copied is stored. The destination physical address is indicative of the address of the copy destination block. As described above, the destination physical address may be the identifier of the copy destination block group (destination block group).

The bit map includes a plurality of bits corresponding to a plurality of physical storage locations in the copy source block, respectively. The value of a bit "1" is indicative that the data portion stored in a corresponding physical storage location is copy target data. The value of a bit "0" is indicative that the data portion stored in a corresponding physical storage location is not copy target data.

For example, as shown in FIG. 16, when the source physical address included in a copy command is indicative of the physical address of block BLK1, and the bit map included in the copy command is indicative of "1110000000000000", the controller 4 determines only data portion D1, data portion D2 and data portion D3 as copy target data from data portions D1 to D16 stored in block BLK1 based on the bit map "1110000000000000".

FIG. 17 illustrates an erase command issued to the flash storage device 3.

An erase command may include a command ID and a block address. The command ID is the unique identifier of the erase command. The block address is indicative of the block address of the erase target block.

FIG. 18 illustrates a trim command issued to the flash storage device 3.

A trim command is used as the above invalidation request specifying one or more valid data portions stored in a block as invalidation target data. The trim command may include a command ID, a physical address and a length. The command ID is the unique identifier of the trim command. The physical address is indicative of the first physical address in which the data to be invalidated is stored. The physical address is represented by a block address and an in-block offset. The length is indicative of the size of the data to be invalidated.

FIG. 19 is a flowchart illustrating the procedure of write operation performed in the flash storage device 3.

When the controller 4 receives a command from the host 2, the controller 4 determines whether or not the received command is a write command (step S41).

When the received command is a write command (YES in step S41), the controller 4 determines which period (here, a day, three days, seven days or a month) is identified by the lifetime information included in the write command (steps S42, S44, S46 and S48).

When the period identified by the lifetime information is a day (YES in step S42), the controller 4 writes the write data associated with the write command into a write destination block allocated to block group 41 (that is, a write destination block for a day) (step S43). The controller 4 transmits the physical address indicative of the physical storage location in which the write data is written as an address recording request to the host 2 (step 350).

When the period identified by the lifetime information is three days (YES in step S44), the controller 4 writes the write data associated with the write command into a write destination block allocated to block group 42 (that is, a write destination block for three days) (step S45). The controller 4 transmits the physical address indicative of the physical storage location in which the write data is written as an address recording request to the host 2 (step 350).

When the period identified by the lifetime information is seven days (YES in step S46), the controller 4 writes the write data associated with the write command into a write destination block allocated to block group 43 (that is, a write destination block for seven days) (step S47). The controller 4 transmits the physical address indicative of the physical storage location in which the write data is written as an address recording request to the host 2 (step S50).

When the period identified by the lifetime information is a month (YES in step S48), the controller 4 writes the write data associated with the write command into a write destination block allocated to block group 44 (that is, a write destination block for a month) (step S49). The controller 4 transmits the physical address indicative of the physical storage location in which the write data is written as an address recording request to the host 2 (step S50).

FIG. 20 is a flowchart illustrating the procedure of copy operation and invalidation operation performed in the flash storage device 3.

Regarding each of block group 41 to block group 44, the controller 4 detects, of the blocks (active blocks) in which valid data is stored, a block in which the elapsed time from the time point at which the block has been filled with write data exceeds a corresponding period (step S51).

The controller 4 notifies the host 2 of a list of the LBAs of the valid data portions stored in the detected block or a list of the LBAs of all the data portions stored in the detected block (step 353).

When the controller 4 receives a copy request (copy command) from the host 2 (YES in step S53), the controller 4 copies one or more copy target data portions specified by the copy request to the copy destination block group (for example, the write destination block of the copy destination block group) specified by the copy request (step S54).

When the controller 4 receives an invalidation request (trim command) from the host 2 (YES in step S55), the controller 4 invalidates one or more invalidation target data portions specified by the invalidation request (step S56).

When the controller 4 receives an erase request (erase command) from the host 2 (YES in step 357), the controller 4 performs the erase operation of the block specified by the erase request and releases the block as a free block (step S58).

As explained above, according to the present embodiment, regarding each of block group 41 to block group 44, the controller 4 detects, of the blocks (active blocks) in which valid data is stored, a block in which the elapsed time from the time point at which the block has been filled with write data exceeds a corresponding period. For example, when the controller 4 detects, of the blocks in which valid data portions are stored and which belong to the first block group, a first block in which the elapsed time from the time point at which the block has been filled with write data exceeds the first period (for example, a day) corresponding to the first block group, the controller 4 notifies the host 2 of a list of the identifiers of the valid data portions stored in the first block (or a list of the identifiers of all the data portions stored in the detected block). In this way, it is possible to provide the host 2 with a chance to reestimate the new lifetime of each data portion (valid data portion) stored in the first block. When a first copy request specifying one or more valid data portions stored in the first block as copy target data and specifying the second block group for storing data corresponding to the second period longer than the first period (for example, a day) as a copy destination block group is received from the host 2, the controller 4 copies one or more valid data portions specified as copy target data from the first block to the second block group. In this way, data in which the actual lifetime becomes longer than the first period (for example, a day) can be restored in a block group for storing data corresponding to a period longer than the first period.

Thus, in comparison with a case where all the valid data portions stored in the first block are maintained in the first block, a possibility that all the data portions in each block are invalidated by erasing or updating (rewriting) the data can be increased. In this way, the write amplification of the flash storage device 3 can be reduced.

As described above, the present embodiment can provide the host 2 with information useful for reducing the write amplification of the flash storage device 3, thereby improving the performance of the flash storage device 3.

In the present embodiment, the host 2 is notified of a list of the identifiers of the valid data portions stored in the first block (or a list of the identifiers of all the data portions stored in the detected block). However, each of the valid data portions may be transmitted to the host 2 together with a list of the identifiers of the valid data portions stored in the first block. In this case, instead of transmitting a copy request to the flash storage device 3, the host 2 may transmit, to the flash storage device 3, a write command including the new lifetime information of a valid data portion which should be restored in another block group.

In the present embodiment, a NAND flash memory is exemplarily illustrated as a nonvolatile memory. However, the function of the embodiment is also applicable to other various nonvolatile memories such as a magnetoresistive random access memory (MRAM), a phase-change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
   a nonvolatile memory including a plurality of blocks; and
   a controller electrically connected to the nonvolatile memory and configured to receive a write command from the host, the write command including an identifier of write data and lifetime information of the write data, the lifetime information identifying a period to which a lifetime of the write data belongs, wherein
   the controller is configured to:
   when the period identified by the lifetime information of the received write command is a first period, write the write data into a first write destination block allocated for a first block group for storing data having a lifetime corresponding to the first period;
   when the period identified by the lifetime information of the received write command is a second period longer than the first period, write the write data into a second write destination block allocated for a second block group for storing data having a lifetime corresponding to the second period;

detect, of blocks which belong to the first block group, a first block containing data in which an elapsed time from a time point at which the data has been written to the first block is longer than the first period;

notify the host of a first list of identifiers identifying valid data portions stored in the first block or a second list of identifiers identifying all data portions stored in the first block, wherein each of the valid data portions is data in which an elapsed time from a time point at which the data has been written to the first block is longer than the first period;

in response to receiving a first copy request from the host after notifying the host of the first list or the second list, the first copy request specifying one or more valid data portions stored in the first block as copy target data and specifying the second block group as a copy destination block group, copy the one or more valid data portions specified as the copy target data from the first block to the second block group; and in response to receiving a first invalidation request from the host after notifying the host of the first list or the second list, the first invalidation request specifying one or more valid data portions stored in the first block as invalidation target data, invalidate the one or more valid data portions specified as the invalidation target data.

2. The memory system of claim 1, wherein the controller is further configured to:

based on a number of rewrites of each free block in the nonvolatile memory, classify the free blocks in the nonvolatile memory into a first free block group having a first degree of wear and a second free block group having a second degree of wear greater than the first degree of wear;

allocate a free block belonging to the first free block group as the second write destination block for the second block group; and allocate a free block belonging to the second free block group as the first write destination block for the first block group.

3. The memory system of claim 1, wherein the controller is further configured to:

when the period identified by the lifetime information of the received write command is a third period longer than the second period, write the write data into a third write destination block allocated for a third block group for storing data having a lifetime corresponding to the third period; and when the third write destination block is filled with the write data, manage the third write destination block as a block in which a valid data portion is stored and which belongs to the third block group, and allocate a new third write destination block for the third block group.

4. The memory system of claim 3, wherein the controller is further configured to:

in response to receiving a second copy request from the host after notifying the host of the first list or the second list, the second copy request specifying one or more valid data portions stored in the first block as copy target data and specifying the third block group as a copy destination block group, copy the one or more valid data portions specified as the copy target data from the first block to the third block group.

5. The memory system of claim 3, wherein the controller is further configured to:

detect, of blocks which belong to the second block group, a second block containing data in which an elapsed time from a time point at which the data has been written to the second block is longer than the second period;

notify the host of a third list of identifiers identifying valid data portions stored in the second block or a fourth list of identifiers identifying all data portions stored in the second block, wherein each of the valid data portions stored in the second block is data in which an elapsed time from a time point at which the data has been written to the second block is longer than the second period;

in response to receiving a third copy request from the host after notifying the host of the third list or the fourth list, the third copy request specifying one or more valid data portions stored in the second block as copy target data and specifying the third block group as a copy destination block group, copy the one or more valid data portions specified as the copy target data from the second block to the third block group; and in response to receiving a second invalidation request from the host after notifying the host of the third list or the fourth list, the second invalidation request specifying one or more valid data portions stored in the second block as invalidation target data, invalidate the one or more valid data portions specified as the invalidation target data.

6. The memory system of claim 1, wherein the controller is further configured to:

detect each valid data portion stored in the first block by referring to bit map information indicative of validity or invalidity of each data portion stored in the first block; and notify the host of the first list of identifiers identifying each of the detected valid data portions.

7. The memory system of claim 1, wherein the lifetime information included in the received write command is indicative of a time length of the first period or the second period.

8. The memory system of claim 1, wherein the lifetime information included in the received write command is indicative of a first identifier associated with the first period or a second identifier associated with the second period.

9. The memory system of claim 1, wherein a degree of wear of each of blocks belonging to the first block group is greater than a degree of wear of each of blocks belonging to the second block group.

10. The memory system of claim 9, wherein the controller is configured to determine a degree of wear of each of the plurality of blocks, based on a number of rewrites of each of the plurality of blocks.

* * * * *